(12) United States Patent
Luebben et al.

(10) Patent No.: US 7,687,582 B1
(45) Date of Patent: Mar. 30, 2010

(54) METHODS OF PRODUCTION, PURIFICATION, AND PROCESSING OF POLY(HETEROAROMATIC) BLOCK COPOLYMERS WITH IMPROVED SOLUBILITY OR DISPERSABILITY

(75) Inventors: Silvia D. Luebben, Golden, CO (US); Shawn A. Sapp, Westminster, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 245 days.

(21) Appl. No.: 10/954,621

(22) Filed: Sep. 30, 2004

Related U.S. Application Data

(63) Continuation-in-part of application No. 10/234,968, filed on Sep. 3, 2002.

(60) Provisional application No. 60/316,607, filed on Aug. 31, 2001.

(51) Int. Cl.
*C08F 234/00* (2006.01)
*C08F 234/04* (2006.01)
*C08F 293/00* (2006.01)
*C08G 61/12* (2006.01)

(52) U.S. Cl. .................. 525/417; 528/480; 528/499; 528/502 R

(58) Field of Classification Search ............ 528/480, 528/499, 502 R; 525/417
See application file for complete search history.

(56) References Cited

U.S. PATENT DOCUMENTS

| | | | |
|---|---|---|---|
| 3,278,437 A | 10/1966 | Lyman et al. | |
| 3,652,724 A | 3/1972 | Shimomura et al. | |
| 3,673,272 A | 6/1972 | Dean | |
| 3,725,505 A | 4/1973 | O'Malley | |
| 3,816,314 A | 6/1974 | Pappas et al. | |
| 3,873,518 A * | 3/1975 | Strange et al. | 536/91 |
| 3,907,929 A | 9/1975 | Guilbault et al. | |
| 3,993,712 A | 11/1976 | Guilbault et al. | |
| 4,477,657 A * | 10/1984 | Strange et al. | 536/91 |
| 4,554,093 A | 11/1985 | Aldissi et al. | |
| 4,608,129 A | 8/1986 | Tamamura et al. | |
| 4,707,527 A | 11/1987 | Druy et al. | |
| 4,833,183 A * | 5/1989 | Vandenberg | 524/35 |
| 4,900,782 A | 2/1990 | Han et al. | |
| 4,935,164 A | 6/1990 | Wessling et al. | |
| 4,959,430 A | 9/1990 | Jonas et al. | |
| 4,983,322 A | 1/1991 | Elsenbaumer | |
| 4,985,124 A | 1/1991 | Claussen et al. | |
| 4,987,042 A | 1/1991 | Jonas et al. | |
| 5,035,926 A | 7/1991 | Jonas et al. | |
| 5,071,524 A | 12/1991 | Claussen et al. | |
| 5,095,076 A | 3/1992 | Clement et al. | |
| 5,227,092 A | 7/1993 | Han | |
| 5,232,631 A | 8/1993 | Cao et al. | |
| 5,254,633 A | 10/1993 | Han et al. | |
| 5,300,575 A | 4/1994 | Jonas et al. | |
| 5,498,761 A | 3/1996 | Wessling et al. | |
| 5,549,851 A | 8/1996 | Fukushima et al. | |
| 5,552,216 A | 9/1996 | Sugimoto et al. | |
| 5,567,355 A * | 10/1996 | Wessling et al. | 252/500 |
| 5,567,356 A | 10/1996 | Kinlen | |
| 5,571,454 A | 11/1996 | Chen et al. | |
| 5,589,108 A | 12/1996 | Shimizu et al. | |
| 5,589,565 A | 12/1996 | Wudl et al. | |
| 5,616,669 A | 4/1997 | Jin et al. | |
| 5,635,563 A | 6/1997 | Oka | |
| 5,670,607 A | 9/1997 | Chen | |
| 5,720,903 A | 2/1998 | Wessling et al. | |
| 5,728,321 A | 3/1998 | Abe et al. | |
| 5,759,637 A | 6/1998 | Angelopoulos et al. | |
| 5,760,200 A * | 6/1998 | Miller et al. | 536/21 |
| 5,792,558 A | 8/1998 | Jonas et al. | |
| 5,795,942 A | 8/1998 | Rhee et al. | |
| 5,837,859 A | 11/1998 | Teoule et al. | |

(Continued)

FOREIGN PATENT DOCUMENTS

EP 440957 3/1996

(Continued)

OTHER PUBLICATIONS

American Heritage Dictionary of the English Language, online version, entry for "colloid", Houghton Mifflin Company (2003).*

(Continued)

*Primary Examiner*—Jeffrey C Mullis
(74) *Attorney, Agent, or Firm*—Greenlee, Winner and Sullivan, P.C.

(57) ABSTRACT

This invention relates to improved methods for the preparation, purification, and processing of poly(heteroaromatic) block copolymers, as well as compositions prepared by these methods. Methods relate to preparation of multiblock and triblock copolymers of intrinsically conducting polymers (ICPs) containing at least one block of a poly(heteroaromatic) polymer and at least two blocks of a non-conducting polymer. This invention provides polymer solutions or dispersions of improved stability and better film-forming properties. The poly(heteroaromatic) block copolymers are obtained in their conducting or doped form, and are retained in a solvated, wet form throughout the production and purification processes. Stable solutions or dispersions of the purified copolymers in organic solvents, water, or mixtures thereof are provided. Stable solutions or dispersions of ICPs are useful in the preparation of semiconducting and conducting films, blends, and coatings on a variety of substrates using standard processing and coating techniques.

24 Claims, 1 Drawing Sheet

U.S. PATENT DOCUMENTS

| | | | |
|---|---|---|---|
| 5,843,741 | A | 12/1998 | Wong et al. |
| 5,863,465 | A | 1/1999 | Kinlen |
| 5,866,043 | A | 2/1999 | Ikkala et al. |
| 5,871,671 | A | 2/1999 | Kinlen et al. |
| 5,908,898 | A | 6/1999 | Wan-Cheng et al. |
| 5,917,693 | A | 6/1999 | Kono et al. |
| 5,929,172 | A | 7/1999 | Zajaczkowski |
| 5,932,144 | A | 8/1999 | Shimizu et al. |
| 5,958,301 | A | 9/1999 | Angelopoulos et al. |
| 5,968,417 | A | 10/1999 | Viswanathan |
| 5,976,418 | A | 11/1999 | Fuller et al. |
| 5,980,784 | A | 11/1999 | Shimizu et al. |
| 5,993,694 | A | 11/1999 | Ito et al. |
| 5,993,696 | A | 11/1999 | Hanhi et al. |
| 5,994,498 | A | 11/1999 | Tripathy et al. |
| 6,004,483 | A | 12/1999 | Jonas et al. |
| 6,010,645 | A | 1/2000 | Angelopoulos et al. |
| 6,025,462 | A | 2/2000 | Wang et al. |
| 6,054,083 | A * | 4/2000 | Asano et al. ............... 264/117 |
| 6,095,148 | A | 8/2000 | Shastri et al. |
| 6,099,757 | A | 8/2000 | Kulkarni |
| 6,103,145 | A | 8/2000 | Angelopoulos et al. |
| 6,107,439 | A | 8/2000 | Yanus et al. |
| 6,602,974 | B1 | 8/2003 | McCullough et al. |
| 7,270,871 | B2 * | 9/2007 | Jiang et al. ............... 428/304.4 |
| 2002/0160271 | A1 * | 10/2002 | Frech et al. ................. 429/314 |
| 2003/0088032 | A1 | 5/2003 | Luebben et al. |
| 2005/0037220 | A1 * | 2/2005 | Smith et al. ................. 428/523 |
| 2005/0118819 | A1 * | 6/2005 | Minamihaba et al. ....... 438/689 |
| 2006/0057451 | A1 | 3/2006 | Okuzaki et al. |

FOREIGN PATENT DOCUMENTS

| | | |
|---|---|---|
| JP | 06 256509 | 9/1994 |
| WO | WO 97/04464 | 2/1997 |
| WO | WO 97/16545 | 5/1997 |
| WO | WO 99/16084 | 4/1999 |
| WO | WO 99/19391 | 4/1999 |
| WO | WO 00/24816 | 5/2000 |
| WO | WO 03/018648 | 3/2003 |
| WO | 2004/067637 A1 | 8/2004 |

OTHER PUBLICATIONS

Aime, J.P. (1991) "Structural Characterization of Conjugated Polymer Solutions," In; *Conjugated Polymers*, Bredas et al. eds., Kluwer Academic Publishers, pp. 259-267.

Biran, C. (2002) "Mechanical Properties of Conducting H-Type Polysiloxane-Polypyrrole Graft Copolymers and Polytetrahydrofuran-Polypyrrole Block Copolymers," *J. Appl. Polym. Sci.* 86:1663-1666.

Bozkurt et al. (2002) "Conduction Mechanism in H-Type Polysiloxane-Polypyrrole Block Copolymers" *J. Appl. Polym. Sci.* 85:52-56.

Carey et al. (1990) *Advanced Organic Chemistry*, Third Ed., Part A, Plenum Press, New York, p. 531-532.

Chandrasekhar, P. (1999) *Conducting Polymers, Fundamental and Applications*, Kluwer Academic Publishers, Boston,pp. 3-22 and 277-287.

Cho et al. (pub. after Sep. 24, 2003) "Intra-Molecular Energy Transfer Characteristics of Novel Oligo(thienylphenyl)amine Derivatives Having a Gradient Structure," *Macromol. Chem. Phys.* 204:2175-2182.

Francois et al. (1993) "Polystyrene—Polythiophene Block Copolymers (PS-PT) Synthesis, Characterization and Doping," *Synthetic Metals* 55-57:3489-3494.

Francois et al. (1995) "Block-Copolymers with Conjugated Segments: Synthesis and Structural Characterization," *Synthetic Metals* 69:463-466.

Freedman et al. (1975) "An Improved Williamson Ether Synthesis Using Phase Transfer Catalysis," *Tetrahedron Lett.* No. 38:3251-3254.

Fujitsuka et al. (2003, published on Web Dec. 2002) "Photoexcitation and Electron Transfer Properties of Rod- and Coil-Type Oligo(thienylene-ethynylene)s," *J. Phys. Chem. B* 107:739-746.

Groenendaal et al. (2000) "Poly(3,4-ethylenedioxythiopene) and Its Derivatives: Past, Present, and Future," *Adv. Mat.* 12:481-494.

Gumbs, R.W. (1997) "Polythiophene and Polypryrrole Copolymers," In; *Handbook of Organic Conductive Molecules and Polymers*, Singh Nalwa, H. Eds., John Wiley & Sons, pp. 469-504.

Heywang and Jonas (1992) "Poly(alkylenedioxythiophene)s—New, Very Stable Conducting Polymers," *Adv. Mater.* 4:116-118.

Hopkins et al. (1996) "Characterization of Solution and Solid State Properties of Undoped and Doped Polyanilines Processed from Hexaflouro-2-Propanol," *Macromol.* 29:7838-7846.

Jin et al. (2000) "Electrochemical Copolymerization of Pyrrole and Styrene," *Macromol.* 33:4805-4808.

Jin et al. (pub. in or before Aug. 2004) "Main Chain Perfluorocyclobutyl (PFCB) Liquid Crystalline Polymers with Oligo-*P*-Phenylene Vertebrae," *Polmer Preprints* 45(2):91-92.

de Jong et al. (Apr. 2003) "The Electronic Structure of *n*- and *p*-doped phenyl-capped 3,4-ethylenedioxythiophene Trimer," *J. Chem. Phys.* 118(14):6495-6502.

Keegstra et al. (1992) "Copper (I) Halide Catalysed Synthesis of Alkyl Aryl and Alkyl Heteroaryl Ethers," *Tetrahedron* 48:3633-3652.

Kiebooms et al. (1997) "Thermal and Electromagnetic Behavior of Doped Poly(3,4-ethylenedioxythiophene) Films," *J. Phys. Chem. B* 101:11037-11039.

Kinlen et al. (1999) "Synthesis and Characterization or Organically Soluble Polyaniline and Polyaniline Block Copolymers," *Synthetic Metals* 101:758-761.

Kumar et al. (1998) "Conducting Poly(3,4-alkylenedioxythiophene) Derivatives as Fast Electrochromics With High Contrast Ratios," *Chem. Mater.* 10:896-902.

Lazzaroni et al. (1999) "Microstructure of Block Copolymers Containing a Conjugated Segment, as Studied with Atomic Force Microscopy," *Synthetic Metals* 102:1279-1282.

Leclere et al. (2000) "Highly Regular Organization of Conjugated Polymer Chains via Block Copolymer Self-Assembly," *Adv. Mater.* 12(14):1042-1046.

Lee et al. (2001) "Supramolecular Structures from Rod-Coil Block Copolymers," *Chem. Rev.* 101:3869-3892.

Lefebvre et al. (1999) "Chemical Synthesis, Characterization, and Electrochemical Studies of Poly(3,4-ethylenedioxythiophene)/Poly-(styrene-4-sulfonate) Composites," *Chem. Mater.* 11:262-268.

Leung et al. (1993) "Synthesis and Electrical Properties of Polyacetylene Copolymers from Poly(phenyl vinyl sulfoxide) and its Oxidized Products," *Macromol.* 26:4426-4436.

Li et al. (1989) "Synthesis and Characterization of Soluble Polyaniline," *Synthetic Metals* 29:E329-E336.

Li and Wang (published on Web Jan. 2004) "Synthesis and Solution Aggregation of Polystyrene-Oligo(*p*-phenyleneethynylene)-Polystyrene Triblock Copolymer," *Macromol.* 37:1172-1174.

McCullough, R.D. (1998) "The Chemistry of Conducting Polythiophenes," *Adv. Mater.* 10:93-116.

Mohanakrishnan et al. (1999) "Functionalization of 3,4-Ethylenedioxythiophene," *Tetrahedron* 55:11745-11754.

Naarmann et al. (1988) "Synthesis of New Electronically Conducting Polymers," In; *Electroresponsive Molecular and Polymeric Systems*, vol. 1, Skotheim, T.A. Ed., Marcel Dekker, Inc., New York and Basel, pp. 1-39.

Odian, G. (1991) *Principles of Polymerization*, 3$^{rd}$ Edition, John Wiley & Sons, Inc., pp. 1.

Rajappa, S. (1984) "Thiophenes and Their Benzoderivatives: (ii) Reactivity," In; *Comprehensive Heterocyclic Chemistry*, Bird et al. ed., Pergamon Press, Oxford, pp. 771-773.

Rivers et al. (Jan. 2002) "Synthesis of a Novel, Biodegradable Electrically Conducting Polymer for Biomedical Applications," *Adv. Funct. Mater.* 12(1):33-37.

Ustamehmetoglu. B. (2001) "Soluble Polypyrrole Copolymers," *J. Appl. Polym. Sci.* 82:1098-1106.

Van Hutten et al. (1995) "Structure of Thiophene-Based Regioregulator Polymers and Block Copolymers and Its Influence on Luminescence Spectra," *J. Phys. Chem.* 99:3218-3224.

Vogel, A.I. (1998) *Textbook of Practical Organic Chemistry*, 5$^{th}$ edition, reprint Longman, Songapore, pp. 557-559, 583-585.

Wagner et al. (2001) "Rigid-Flexible Alternating Block Copolymers That Contain Poly(*p*-phenylene) Units of Defined Length as the Rigid Blocks," *Macromol.* 34:5740-5743.

Wessling, B. (1998) "Dispersion as the Key to Processing Conducting Polymers," In; *Handbook of Conducting Polymers*, 2$^{nd}$ Ed, Skotheim et al. ed., Marcel Dekker, New York, pp. 467-475.

Zhang et al. (1991) "Electrically Conductive Blocked Copolymer of Polyaniline and Poly(p-phenylene-terephthalamide)," *Synthetic Metals* 41-43:251-254.

Siddhanta, S.K. et al. (Mar. 2005) "Conducting polymer gel: formation of a novel semi-IPN from polyaniline and crosslinked poly(2-acrylamido-2-methyl propanesulphonicacid)" Polymer, vol. 46, pp. 2993-3000.

\* cited by examiner

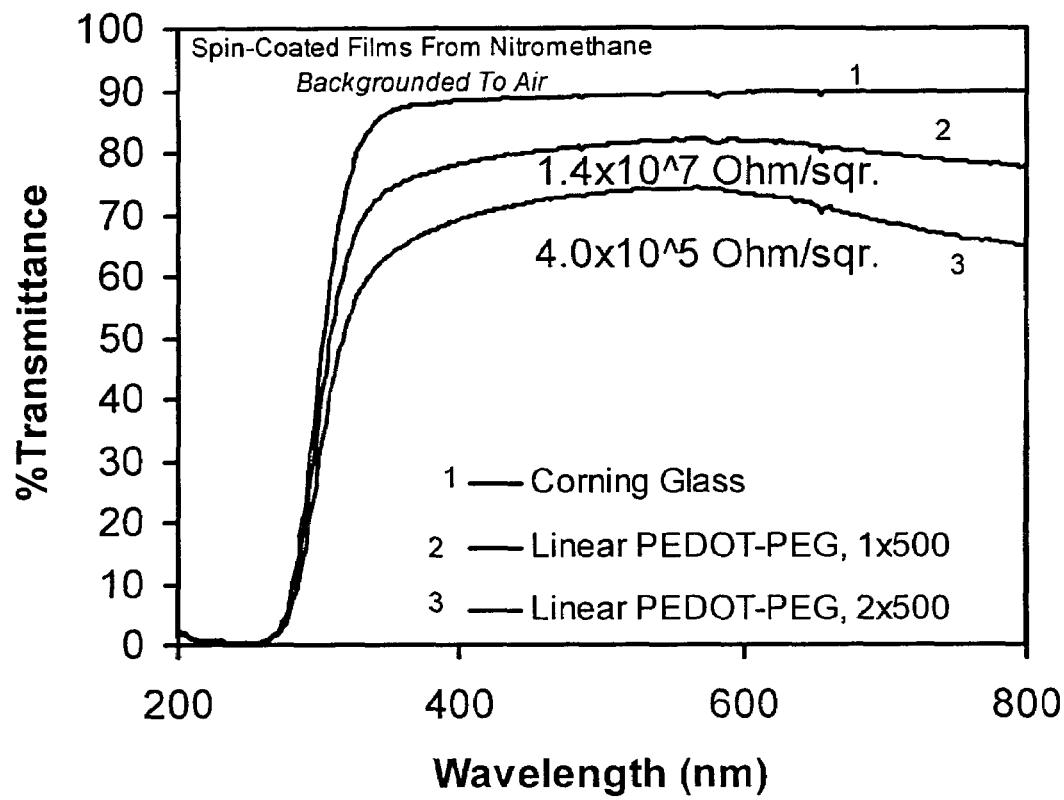
Figure 1. Optical clarity and surface resistivity of poly(EDOT-*block*-EG 1098).
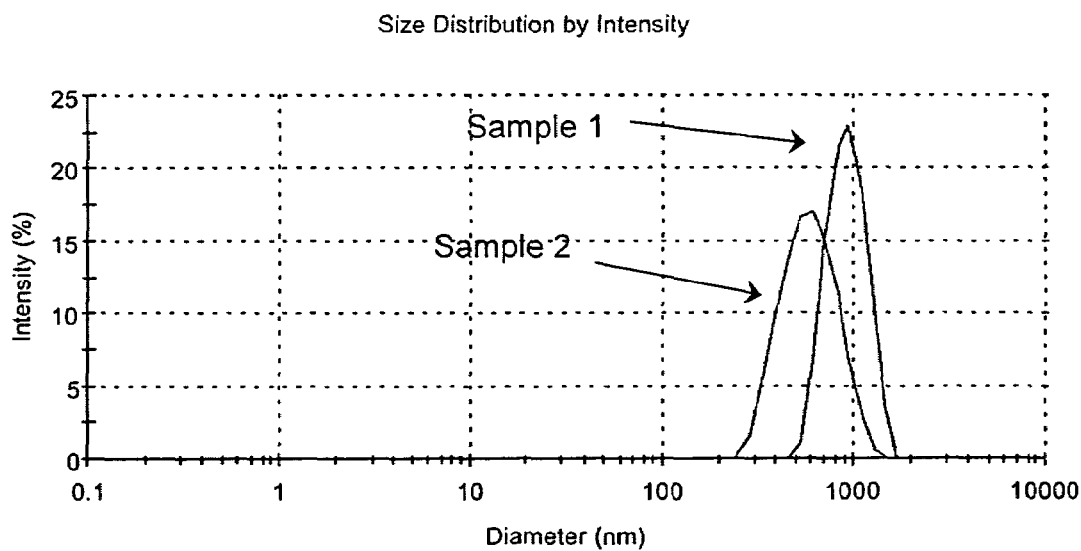
Figure 2. Particle size and size distribution in solution by light scattering analysis.

US 7,687,582 B1

METHODS OF PRODUCTION, PURIFICATION, AND PROCESSING OF POLY(HETEROAROMATIC) BLOCK COPOLYMERS WITH IMPROVED SOLUBILITY OR DISPERSABILITY

CROSS-REFERENCE TO RELATED APPLICATIONS

This application is a continuation-in-part of U.S. patent application Ser. No. 10/234,968, filed Sep. 3, 2002 which claims priority under 35 U.S.C. 119(e) from U.S. provisional application 60/316,607, filed Aug. 31, 2001. Each of these applications is incorporated by reference herein in its entirety.

STATEMENT REGARDING FEDERALLY SPONSORED RESEARCH

This invention was made, at least in part, with funding from the National Science Foundation and the Department of Defense, Contract Nos. DMI-0110105 and F49620-03-C-0065. Accordingly, the United States government has certain rights in the invention.

BACKGROUND OF THE INVENTION

Intrinsically conducting polymers (ICP) are polymers with extended π conjugation along the molecular backbone. Oxidation (p-doping) of the polymer transforms the chains from neutral species to poly(cation)s. Macroscopically the electrical conductivity of these polymers increases by several orders of magnitude upon oxidation. The delocalization of the positive charges (holes) along the conjugated π electron system is responsible for the conductivity of these materials. Because of their extended π conjugation and poly(ionic) nature, most conducting polymers do not melt or dissolve in common solvents, and therefore can not be processed.

Intrinsically conducting polymers have been produced chemically from a solvated mixture of monomer(s) and oxidizers. The polymerization takes place as monomer units are oxidized to form radical cations. These radical species couple with each other with the loss of two protons, forming a colvalent bond. Doping also occurs simultaneously with polymerization via oxidation and results in the formation of positively charged conducting polymer chains. This ionic character causes aggregation of polymer chains, and leads to an insoluble material that precipitates from solution during the oxidative polymerization process. Overall, what results from the oxidative polymerization reaction is a solvent mixture of doped polymer precipitate, spent oxidizing agent, acid, and any unreacted monomer or oxidizing agent. Typically, the intrinsically conducting polymer product is purified by filtration from the above mixture to a "dried" state (the terms dried, dry, drying, etc. herein are used broadly to refer generally to removal of any organic solvent, water and mixtures thereof to form a solid residue or powder) followed by further washing and drying of the filtered product.

The advantage of the oxidative chemical polymerization described above is that the polymer is obtained in its stable doped state. High conductivity or heavy doping can provide the desired electronic properties in a given material, but this very same process leads to a highly ionic character along the polymer chains. Again, this ionic character causes aggregation and precipitation of polymer chains to form an insoluble product.

Poly(heteroaromatic) polymers are a class of ICPs made by oxidative polymerization of heteroaromatic monomers (see below). Many methods for chemically polymerizing heteroaromatic ICPs are known to those skilled in the art. In general, chemical polymerization is carried out by the combination of a chemical oxidizing agent and one or more heteroaromatic monomer(s). The polymerization is usually carried out in water, a polar organic solvent, or a mixture thereof. However, the procedure leads to the formation of the oxidized or doped form of the heteroaromatic ICP. This doped form is positively charged and retains charge-balancing anions. The ionic nature of this material causes it to self-aggregate; the particles formed from this aggregation become insoluble and precipitate out of solution.

For example, McCullough has described what is known as the "ferric chloride" or "$FeCl_3$" method of polymerizing polythiophenes, a type of poly(heteroaromatic) ICP. This method involves the use of $FeCl_3$ as the oxidant combined with one or more thiophene monomers all dissolved and reacted in chloroform [McCullough, R. D., *Advanced Materials*, 10, (1998) 93-116].

Lefebvre et al. describe a method for producing poly(styrene sulfonate)-doped poly(3,4-ethylenedioxythiophene) or PEDOT (another poly(heteroaromatic) ICP)) using either ferric chloride or ferric nitrate in water or in water/acetonitrile mixtures. The described method resulted in "deep blue powders" that were filtered, washed, and dried to yield an insoluble, intractable powder. They also describe the formation of dispersions of these powders in 20% suspensions of poly(tetrafluoroethylene) in some unidentified solvent; the details of this procedure, including the solvent used are not provided. This suspension was treated with ultrasound and "spread uniformly onto carbon fiber paper" for use as an electrode structure. No characterization was carried out on this film other than electrochemistry [Lefebvre, M. et al., *Chemistry of Materials*, 11, (1999) 262-268].

The formation of non-poly(heteroaromatic) ICPs as dispersible or otherwise processable solids has been reported. U.S. Pat. No. 5,567,355 (Wessling, B. et al.) reports a process for the formation of intrinsically conducting polyaniline powder in the form of a dispersible dry solid. The preparation process of this patent is specific to the chemistry and electrochemistry of the aniline monomer and polymer. U.S. Pat. No. 4,935,164 (Wessling, B. M. et al.) reports a process for forming blends of ICPs in liquid thermoplastics or solvent dissolved plastics. Examples reported include the use of polyacetylene and polypyrrole as the electrically conducting filler in blends, but poly-para-phenylenes and polyanilines are also reported to be useful. The reported process and blends formed from that process use a dry solid form of the ICP to improve the conductivity of the resulting blend. U.S. Pat. No. 5,254,633 (Han, et al.) reports a process for preparing polyaniline-coated polymer or copolymer particles. They also report the preparation of polymer-particle blends incorporating these polyaniline-coated particles to impart conducting properties to the overall blend.

U.S. Pat. No. 5,498,761 (Wessling, B. et al.) reports a process for the production of ICP films on substrates by coating from a "metastable dispersion". This patent states that "the concentration of the dispersed conductive polymers in the solvents can be selected within in a very wide range, from almost zero (e.g. $10^{-5}\%$) to over 5%". In addition, this patent teaches that gel formation in the ICP compositions is undesirable for use in forming thin films.

Published PCT application WO03018648 (published Mar. 6, 2003) and published U.S. patent application 20030088032 (published May 8, 2003) (Luebben et al.) report block copolymers containing at least one block of a poly(heteroaromatic) polymer and at least two blocks of a non-conjugated polymer. The chemically different blocks of the copolymer are covalently bonded to each other in an alternating fashion through an appropriate linkage group. The poly(heteroaromatic) polymer is an intrinsically conducting polymer (ICP) and when the ICP block or blocks of the block copolymer are in the doped form, the block copolymer is electrically conducting. These applications also provide a method for the preparation of such block copolymers comprising a first step in which a non-conducting block of appropriate molecular weight is modified with one or two linkage groups that undergo oxidative polymerization, and a second step in which the modified non-conducting block is copolymerized with a heteroaromatic monomer under oxidative conditions to form a tri- or a multi-block copolymer. Tri-block copolymers are formed using non-conducting blocks that have one linkage group, while multi-block copolymers are formed using non-conducting blocks that have two linkage groups. Tri-block copolymers have the form BAB (where "A" is the poly(heteroaromatic conducting block, and "B" is a non-conducting polymeric segment), while multi-block copolymers contain a minimum of 4 blocks (e.g. ABAB).

Published applications WO03018648 and US 20030088032 report that copolymers containing blocks of poly(heteroaromatic) ICPs spaced by blocks of non conducting polymers form finely-divided dispersions in organic solvents, and that these dispersions can be used to cast thin films. The block copolymers reported in these applications are easier to process than the corresponding intrinsically conducting homopolymers. While these applications can provide dispersions of poly(heteroaromatic) copolymers which are sufficiently stable to be used in practical commercial applications immediately after their preparation, the present invention provides improved polymerization, purification and dispersion techniques which result in significant improvements in shelf life and long-term stability of such dispersions which further promotes the commercial utility of ICP polymers. Furthermore, dispersions prepared according to this invention have small average number particle size, narrow particle size distribution, and good wetting properties on glass and organic substrates. Thin films prepared from these dispersions are uniform and electrically conducting.

There remains a significant and continuing need in the art for conducting polymers that exhibit improved processability and mechanical and physical properties, and stable forms of solutions or dispersions that have sufficient lifetime (a minimum shelf-life of 3 months is preferred) to allow their use as ready-to-use commercial products.

SUMMARY OF THE INVENTION

The present invention provides improved polymerization, purification and dispersion techniques that provide ICP poly (heteroaromatic) block copolymers with significantly improved properties. These improved properties enable the facile formation of stable solutions or dispersions of the poly (heteroaromatic) block copolymers in non-aqueous solvents (i.e., organic solvents), aqueous solvents, water, or miscible mixtures thereof without the need for stabilizer additives. More specifically, this invention provides improved copolymerization conditions to form copolymers of controlled structure that are easier to disperse, the compositions containing copolymers made by these improved methods, and new purification and re-dispersion techniques that allow the copolymer colloidal particles in a highly solvated state (or "wet" state, wherein the term wet is used broadly herein to refer to the presence of any solvent, including water, aqueous solvent and non-aqueous solvent) throughout the purification and processing procedures, resulting in solutions or dispersions with greatly improved stability and properties. Furthermore, dispersions prepared according to this invention have average number particle size smaller than 50 microns, and more preferably smaller than 5 microns and narrow particle size distribution with polydispersity lower than 0.5. They, also, have good wetting properties on glass and organic substrates without the addition of binders or formulation additives.

In the doped (conducting) state, ICPs are polyionic molecules in which the ionic charges are delocalized over a conducting segment of the molecular backbone. For a p-type conductor "holes" in the valance band of the conjugated material are delocalized, while for an n-type conductor electrons in the conduction band are delocalized. The chains are polycationic when they are doped through oxidation (p-doping) as herein. Counter-ions (anions for p-doped polymers) are present within the polymeric matrix to compensate for the charges on the polymer conducting segment. Counter-ions can be organic or inorganic. Exemplary organic counter-ions are para-toluene sulfonate and triflate. Exemplary inorganic counter-ions are perchlorate and sulfate.

The present invention also provides a composition comprising block copolymers that is a highly swollen, wet gel state obtained by the formation of poly(heteroaromatic) block copolymer particles under specific preparation and purification procedures. This intermediate gel state differs from the final dispersion because it has a much higher viscosity and the copolymer is in a higher concentration (3-20 wt. %) than in the dispersed state (0.2—to less than 3.0 wt. %). If this wet gel state is maintained throughout purification and processing of the copolymers, solutions or dispersions with greatly improved stability and properties result.

Thin films prepared from the dispersions of this invention are uniform with surface roughness lower than 100 nm and preferably lower than 50 nm. Their surface resistivity can be readily tuned over six orders of magnitude to optimally meet the needs of a given application by changing the relative length of the copolymer blocks and/or the doping agent. Thin films of this invention, also, have good adhesion properties on organic substrates such as polycarbonate (PC) and polyethylene terephthalate (PET), and good optical clarity, when using 3,4-ethylenedioxythiophene as the heteroaromatic monomer.

In specific embodiments, the wet gel state comprising block copolymers has a copolymer concentration greater than 2 wt. %. In specific embodiments, the wet gel state comprising block copolymers has a copolymer concentration greater than 5 wt. %. In other specific embodiments, the wet gel state comprising block copolymers has a copolymer concentration between about 3 wt. % and about 13 wt. %. In other specific embodiments, the wet gel state comprising block copolymers has a copolymer concentration between about 5 wt. % and about 13 wt. %. In other specific embodiments, the wet gel state comprising block copolymers has a copolymer concentration between about 7 wt. % and 10 wt. %.

This wet gel state consists of highly swollen (solvated) particles of poly(heteroaromatic) block copolymer in a doped form and is produced by chemical oxidation using iron(III)-based chemical oxidants in polar aprotic solvents. Purification via centrifugation, stirred-cell filtration, dialysis, or ion exchange chromatography allows the removal of impurities (e.g., residual oxidant, etc.), while maintaining the material in the desired wet gel state. From the purified gel, stable solutions or dispersions are readily formed in a variety of liquids by dilution and processing with ultrasound or high-sheer mixing. The specific methods of purification described in the present invention facilitate purification and isolation of poly (heteroaromatic) block copolymers particles in a liquid or wet state.

The present invention provides an improved method for the preparation of poly(heteroaromatic) block copolymers in their doped form via oxidative chemical copolymerization. In a preferred embodiment the copolymerization reaction is conducted in a polar aprotic solvent or mixtures thereof and the chemical oxidant is an iron(III) salt, a persulfate or other chemical oxidant that is soluble in the selected solvent(s). In a preferred embodiment the reaction solvent is acetonitrile. In a preferred embodiment of this invention, the copolymerization is carried out in acetonitrile and the oxidant is ferric perchlorate, ferric p-toluenesulfonate, ferric trifluoromethylsulfonate, ferric sulfate, or a ferric salt of a deprotonated organic acid. The heteroaromatic monomer and linker-modified non-conducting block may be selected from any number of choices and ratios as described in more detail in published US 2003,088,032, which is specifically incorporated by reference herein in its entirety for such details of polymerization. Additional salts, surfactants, or ionic polymers may be added to the copolymerization reaction as well. The copolymerization reaction can be run at any temperature and for any length of time to obtain a desired copolymerization product, but in a preferred embodiment, the copolymerization is conducted at 25 deg. C. for about 36 hours.

The copolymerization of this invention can be conducted with the materials, reagents and intermediates for the preparation ICP copolymers, particularly block copolymers, employing branched and hyperbranched end-capping monomers that are described in concurrently filed U.S. patent application Ser. No. 10/957,325 entitled "ELECTRICALLY CONDUCTING MATERIALS FROM BRANCHED END-CAPPING INTERMEDIATES." The disclosure of this concurrently filed U.S. application is incorporated in its entirety by reference herein.

The present invention also provides a method for the purification of the crude copolymer mixture which results from copolymerization into a wet gel state. This purification method allows the collection of the doped poly(heteroaromatic) block copolymer particles formed from the copolymerization method described above. Collection of the particles can be accomplished by centrifugation, stirred filtration, or dialysis so long as the material resulting from this process is concentrated to the point where it is readily separated from the surrounding solution (which contains the impurities removed). Decanting and rinsing with appropriate non-aqueous or aqueous solvents, water, or a mixture thereof results in an increasingly pure poly(hetoroaromatic) copolymer gel. When the desired level of purity is achieved using one or more of these methods, the wet ICP gel is isolated and either stored in this state for future use, or it is processed into a solution or dispersion.

The present invention also provides a method for the processing of wet poly(hetoroaromatic) copolymer gels into a, stable dispersion with small particle size and narrow particle size distribution for use as a conducting ink or paint, from which thin conducting films or patterns can be coated or printed onto a variety of substrates using standard coating and printing techniques. Wet poly(hetoroaromatic) copolymer gels can be processed into high quality dispersions by first diluting the gel to a desired concentration in an appropriate polar aprotic solvent. In a preferred embodiment of this invention, the dispersions formed in nitromethane, nitroethane, propylene carbonate, N-methylpyrrolidone, acetonitrile, chloroform, or mixtures thereof are of particularly high quality. It has been discovered that the mean particle size of the dispersion can be substantially decreased with the use of either ultrasonic processing or high sheer mixing or both. This in turn makes the dispersions more stable and thin films prepared from these dispersion have better properties including improved optical clarity and higher conductivity.

Preferred dispersions have average number particle size less than 50 microns and polydispersity less than 0.5. Most preferred dispersions have average particles size less than 2 microns and polydispersity of 0.3.

Ultrasound can be applied to the dispersion either by immersion of the dispersion into an ultrasonic bath or by the immersion of an ultrasonic probe (horn) directly into the dispersion. High sheer mixing can be accomplished either by the immersion of the mixing head into the dispersion or by the flow of the dispersion through a "flow-through" cell with mixing apparatus. Optionally, as a final processing step, any large (non-dispersed) copolymer particles are removed from these processed dispersions simply by filtering through an appropriate (solvent resistant) filtration medium or glass wool.

The purification method of this invention in which the wet gel intermediate state is subjected to purification presents the additional advantage that the solvents used in the synthesis, for the washes and in the final dispersion can be the same or different from each other.

The invention further provides a method for forming thin films or coatings comprising block copolymers of this invention in which a wet gel comprising a block copolymer is employed directly or after dilution to form the thin film or coating. Use of the wet gels of this invention results in more uniform and consistent thin films and coatings, particularly over time after initial formation of the wet gel. Thin films and coatings can be formed using the wet gels of this invention or its diluted form on a variety of substrates, including, among others, glass or quartz surfaces, glass or quartz fibers, metal surfaces, metal foils, fibers, plastic fibers, silicon surfaces, silicon wafers, semiconductor surfaces, mixed oxide surfaces, indium tin oxide surfaces, semiconductor wafers, electrodes, plastic surfaces, plastic films, and ceramic surfaces. The wet gels of this invention can be used to form thin film layers or coatings or patterned thin films or patterned coatings on such substrates. Thin films or coatings can be formed on flat surfaces or on surfaces which exhibit structures, such as channels, wells, indentations, ridges, or undulations. After a thin film or coating is applied to a surface, the thin film of coating can be subjected to heat and/or drying as is known in the art.

The wet gel can also be used in blends with resins, polymers and elastomers to prepare conducting composites that can be further processed or molded into a desirable shape.

Other aspects, advantages, and applications of the methods and materials of this invention will become apparent on review of the non-limiting detailed description of the invention, the figures and examples provided.

BRIEF DESCRIPTION OF THE FIGURES

FIG. 1. Is a graph illustrating optical clarity and surface resistivity of poly(EDOT-block-EG 1098).

FIG. 2. Is a graph showing particle size and size distribution in a nitromethane dispersion of poly(EDOT-block-EG 1098) by light scattering analysis.

DETAILED DESCRIPTION OF THE INVENTION

Production Methods:

In one aspect, this invention provides methods of producing poly(heteroaromatic) conducting block copolymers with defined compositions. These improved copolymerization methods cause the copolymer chains to grow in solution in the form of a well-stabilized colloidal suspension. This colloidal suspension is stabilized by a steric stabilization mechanism and has a narrow particle size distribution.

Preferred colloidal suspensions of this invention have average number particle size less than 50 microns and polydispersity less than 0.5. Most preferred dispersions have average particles size less than 2 microns and polydispersity of 0.3.

Polymer production is carried out via oxidative co-polymerization of one or more heteroaromatic monomers and one or more soft polymeric blocks that are terminated with one or more groups that undergo oxidative polymerization. Preferred heteroaromatic monomers are pyrrole, N-alkylpyrrole, 3-alkylpyrrole, thiophene, 3-alkylthiophene, 3-alkoxythiophene, 3,4-alkylenylthiophene, 3,4-alkylenedioxythiophene, thieno[3,4-b]thiophenes and their substituted derivatives. Especially preferred monomers are 3,4-ethylenedioxythiophene (EDOT) and its substituted derivatives and thieno[3,4-b]thiophene (TT) and its substituted derivatives. Another preferred monomer is pyrrole and its substituted derivatives. In a preferred embodiment of this invention EDOT monomer is copolymerized with a di-EDOT terminated polymeric soft block. In another preferred embodiment of this invention EDOT monomer is copolymerized with a mono-EDOT terminated polymeric soft block. In another preferred embodiment of this invention TT monomer or its 2-substituted derivatives are copolymerized with a di-EDOT terminated polymeric soft block, a di-TT terminated polymeric soft block, a mono-EDOT terminated polymeric soft block, or a mono-TT terminated polymeric soft block. In another preferred embodiment of this invention pyrrole monomer is copolymerized with a di-pyrrole or mono-pyrrole terminated polymeric soft block. The ratio between the heteroaromatic monomer (either EDOT, TT, or pyrrole) and the oxidizable soft polymeric block in the processes of this invention is selected as known in the art to achieve a desired copolymer structure. In the preferred embodiments, the ratio between the heteroaromatic monomer (e.g., EDOT, TT, or pyrrole) and the oxidizable soft polymeric block ranges from about 20:1 to about 1:5 by weight.

A polymeric block is a section of a polymer formed by a finite number of repeat monomeric units that is bonded to one end or both ends to a polymeric block made by monomeric units of different structure. A "soft" polymeric block is a polymeric block made of a non-conjugated polymer that contains bonds around which free rotation of the molecular backbone of the polymeric block itself can occur at or near room temperature. As is well know in the art bonds that allow free rotation at or near room temperature includes C—C—C, C—O—C, C—S—C, Si—O—Si, C—NR—C, etc.

In a preferred embodiment of this invention the polymerization reaction is carried out in polar aprotic solvents such as acetonitrile and in the presence of a chemical oxidant such as an iron (III) salt or a persulfate. Preferred oxidants are ferric perchlorate, ferric p-toluenesulfonate, ferric triflate, or ferric sulfate. The rate of reaction can be controlled via the temperature. The copolymerization reaction is run at a temperature comprised from −80 deg C. and 160 deg C. for a length of time comprised from about 15 minutes to about 96 hours, but most preferably it is run at 25 deg. C. for a period of time ranging from about 6 to about 36 hours.

Formation and gellation of intrinsically conducting polymer particles often occurs throughout the polymerization period so a proper and thorough means of mixing must be provided throughout the course of the polymerization reaction. Proper mixing can be provided by a magnetic stirring bar, a mechanical stirrer, a high shear mixer, or a homogenizer. A continuous flow cell may be utilized in combination with the high shear mixer or homogenizers.

The result of polymerization is a crude reaction mixture of particles of the intrinsically conducting polymer in its doped or conducting form, spent oxidant, acid (a side product), and unreacted materials. For this production method to be effective in terms of the present invention, the crude reaction mixture must be kept in its liquid form. All due care must be taken to prevent this mixture from drying.

Purification:

The purification methods for separating the poly(heteroaromatic) conducting block copolymer particles from the remaining mixture are another aspect of this invention. To prevent the complete drying of these particles during purification, a number of methods have been successfully applied and are described separately below.

The crude copolymerization mixture can be purified by centrifugation of the mixture at 100-50,000 RPM (revolutions per minute), but more preferably at 1000 to 5000 RPM for a period of a few seconds to 3 hours, but yet more preferably for 1-15 minutes. Proper centrifugation conditions must be used to obtain the separation of two liquid phases (one low viscosity and one high viscosity) and avoid the formation of a hard packed fraction as the bottom phase. The supernatant liquid is decanted and contains impurities removed from the poly(heteroaromatic) block copolymer particles. The bottom phase is a viscous gel and contains the loosely agglomerated ICP copolymer particles. This bottom gel phase is rinsed by dilution and re-suspending in clean solvent with thorough mixing. Centrifugation followed by decanting and rinsing is repeated one or more times until the gel is of the desired purity. The rinsing procedure may be carried out using only the solvent used to carry out the copolymerization reaction, or a sequence of solvents or mixtures of solvents. In a preferred embodiment the synthesis and washes are carried out in acetonitrile and the final dispersion is carried out in nitromethane or propylene carbonate. In another preferred embodiment the synthesis is carried out in acetonitrile, the washes in ethanol, and the dispersion in nitromethane. For a given poly(heteroaromatic) conducting block copolymer preparation, one of ordinary skill in the art in view of the disclosure herein and what is commonly known in the art can readily select appropriate solvents or sequences of solvents to obtain removal of undesirable impurities.

Elemental analysis (Huffman Laboratories) has confirmed the effectiveness of this purification method in terms of reducing the iron content (from spent and unreacted oxidant) of the poly(heteroaromatic) conducting block copolymer particles as a function of the number of centrifugal rinses (see Example 7). For this method to be effective in terms of the present invention, the purified poly(heteroaromatic) copolymer particles must be kept in a wet gel form or immediately diluted with fresh solvent. All due care must be taken to prevent this purified material from drying.

In a preferred embodiment of this invention the concentration of spent oxidant (for example iron) in the purified gel must be lower than 100 ppm. In the most preferred embodiment must be lower than 20 ppm.

Filtration can also be used to purify the crude reaction product if the poly(heteroaromatic) conducting block copolymer particles are maintained in a wet solvated state throughout the process. This wet filtration process offers an added advantage over the centrifugation procedure, since it enables purification in a continuous mode (rather then by subsequent steps) and can be conducted on a much larger scale (i.e. capacity is not limited by maximum centrifuge capacity).

The practice of this inventive process can be carried out using any filtration apparatus with appropriate pore size and filtration medium (solvent resistant) as long as new rinse solvent is added (continuously or in batches) to the filtrate so the latter is not allowed to dry. However, it has been found that the use of mechanical or magnetic stirring during filtration greatly helps to prevent concentration, polarization and clogging of the filtration medium. In addition the application of pressure (or vacuum) can be used to speed up the filtration process.

Pore size of the filtration medium is selected based on the particle size of the poly(heteroaromatic) copolymer so as to prevent the loss of product, yet allowing adequate filtrate flow. This is readily determined empirically for each type of material and typically varies over the range of 500 microns to 0.1 micron pore diameter, but more preferably ranges from 50-0.2 micron. As is known in the art, the filtration medium is selected based on the solvents to be used and it has been found that glass, fluoro-polymers, and nylon are adequate for the solvents and solvent mixtures typically used.

The actual filtration purification procedure is exemplified herein using a solvent resistant stirred-filtration cell (Millipore) fitted with an appropriate filtration membrane. The procedure is as follows. The crude polymerization mixture is poured into the apparatus and allowed to filter with stirring under gravity or applied pressure (up to 80 psi of an inert gas or compressed air) just until a concentrated gel of poly(heteroaromatic) conducting block copolymer particles is formed. Additional volumes of the crude polymerization mixture can be subsequently added until an appropriate volume of gel is obtained within the filtration cell. Rinsing can be accomplished by adding subsequent volumes of clean solvent with stirring while stopping the flow of the filtrate until the gel is properly re-suspended in the solvent, at which point the flow of filtrate is allowed to proceed until again a concentrated gel of poly(heteroaromatic) ICP particles is obtained. This can be repeated until the desired purity is achieved. For this method to be effective in terms of the present invention, the purified poly(heteroaromatic) ICP particles must be kept in a wet gel form or immediately diluted with fresh solvent. All due care must be taken to prevent this purified material from drying.

Alternatively, rinsing can be accomplished in a stirred cell by a constant flow of rinse solvent(s) contained in an appropriate reservoir to which pressure is applied (instead of the stirred cell directly). Solvent(s) under pressure flows out of the reservoir and into the stirred cell at a rate that is equal to the rate of filtration. This is often referred to as diafiltration by those in the art. With the poly(heteroaromatic) conducting block copolymer particle mixture under constant stirring during this process, soluble impurities are washed away. The volume of rinse solvent(s) is controlled so as to yield the desired level of purity. A concentrated gel of poly(heteroaromatic) conducting block copolymer particles is obtained in a final step by disconnecting the solvent reservoir and applying pressure directly to the stirred cell. For this method to be effective in terms of the present invention, the purified ICP particles must be kept in a wet gel form or immediately diluted with fresh solvent. All due care must be taken to prevent this purified material from drying.

The crude polymerization mixture can be purified by dialysis using a solvent resistant dialysis membrane, capsule, or cassette (Fisher). The appropriate pore size (often described as a molecular weight cutoff in dialysis products) is readily determined experimentally for each poly(heteroaromatic) conducting block copolymer material prior to carrying out the procedure. It has been found that low molecular weight cutoff dialysis membranes (in the range of but not limited to 400-4000 AMU) are most appropriate for the present invention. The purification procedure is as follows.

Solvent resistant dialysis tubing is cut to an appropriate length and sealed at one end. This is then filled with the crude polymerization mixture and sealed at the remaining end. Alternatively, a solvent resistant dialysis capsule or cassette can be filled with the crude polymerization mixture by appropriate means. This entire enclosure is then immersed in clean solvent(s) of an appropriate volume and contained in a suitably shaped and sized container to allow complete immersion of the dialysis enclosure. The immersed enclosure is allowed to dialyze for a little as a few minutes, but more typically is dialyzed for 10-18 hours. Rinsing is carried out by replacing the dialyzed solvent with a fresh volume of clean solvent and allowing dialysis to proceed. Rinsing can also be accomplished continuously by applying a flow of fresh solvent to the rinsing vessel. Pressure may also be applied to speed up the exchange of solvents through the dialysis membrane. The flow rate, pressure, and immersion time are adjusted or the number of rinses are repeated until the desired level of purity is reached, at which point the rinsed poly(heteroaromatic) conducting block copolymer particle dispersion can be removed from the dialysis enclosure and concentrated to a wet gel via one of the methods described above. Many continuous dialysis methods are known in the industry (for example in medical applications) and could be applied to this process.

The purification of the crude reaction product can also be carried out by ion exchange chromatography without the need for concentrating the material to the gel state. A sequence of appropriate cationic and anionic columns is used to remove spent oxidants and its counterions. One of ordinary skill in the art, in view of this disclosure and in view of what is commonly known in the art can select anionic and/or cationic ion exchange columns for removal of undesired impurities from a given crude reaction product.

Any one or more of the purification steps described herein above or functional equivalents thereof can be combined as will be readily appreciated by one of ordinary skill in the art to achieve a desired purification state of a polymerization product for a given application.

Processing:

The concentrated poly(heteroaromatic) conducting block copolymer particle gels (wet gels) obtained from any of the methods described above typically contain 2-13 wt. % solids, yet are highly viscous. The gels have been found to be a particularly convenient form in which to store these materials in so long as they are not permitted to significantly further concentrate or dry out. In this form the poly(heteroaromatic) conducting block copolymer particles retain their conductivity and ability to be further processed into stable dispersions. Aggregation of the poly(heteroaromatic) conducting block copolymer particles from this wet gel state has been found to be reversible using the proper processing methods.

In another aspect the invention provides a method of forming stable liquid dispersions. These dispersions may be useful for the direct coating of conducting films on various substrates. Liquid dispersions can be prepared by diluting the poly(heteroaromatic) conducting block copolymer particle gel with an appropriate solvent or mixture of solvents to a desired concentration. This concentration is can be in the range of about 0.1-up to about 3.0 wt. % poly(heteroaromatic) conducting block copolymer particles. More preferable concentrations range from 0.2-1.5% wt. Treating these dilute mixtures with ultrasound produces high quality stable dispersions. Although bath sonication is adequate for this purpose, it has been found that high-powered piezo horn sonicators are the most effective at achieving the best dispersion properties. High-sheer mixing is also a preferred method to produce high quality, stable dispersions of poly(heteroaromatic) conducting block copolymers. A dilute dispersion after being ultrasonically processed in the described manner may be concentrated by any means back to a viscous form to be used, for example, as an ink for various printing methods or to be blended with another viscous material or solid (e.g. rheology modifier, which are known in the art, rubbers, adhesives, or thermoplastics). Diluted dispersions can be stored for several months without a change in their properties. Limited settling of the particles may occur, but settled particles can be readily re-dispersed by mixing or ultrasound processing. Diluted dispersions may be further filtered before use through loosely agglomerated glass wool or a proper filtration medium to remove a small fraction (less than 15% wt. of the original solid content of the dispersion, and more preferably less than 5% wt.) of larger particles. Preferred filtration media include filters made of nylon, polyethylene, polypropylene, tertrafluoroethylene and other fluorinated polymers and elastomers.

Wet gels formed by the method of this invention can be employed to generate colloidal suspensions which exhibit number average particle size of less than about 10 microns as measured in the wet swollen state by laser scattering as is known in the art. Colloidal suspensions formed using wet gels preferably exhibit particle size of less than 2 microns as measured by this method. Colloidal suspensions formed using wet gels preferably exhibit number average particle size equal or less than 1 micron and particle size distribution (polydispersity index) less than 1 as measured in the wet swollen state by laser scattering.

Wet gels formed by the method of this invention can be employed to generate a colloidal suspension which exhibits number average particle size of less then 0.5 micron as determined by measuring the surface roughness of a dry film spin coated on float glass by atomic force microscopy in contact mode with SiN tip as is known in the art. Colloidal suspensions formed form wet gets of this invention preferably exhibit number average particle size of less then 50 nanometers as determined by the same method.

Wet gels formed by the method of this invention can be employed to generate a colloidal suspension that has number average particle size equal or less than 1 micron and particle size distribution (polydispersity index) less than 0.3 as measured in the wet swollen state by laser scattering, and which exhibits number average particle size less then 40 nanometers as determined by measuring the surface roughness of a dry film spin coated on float glass by atomic force microscopy.

DEFINITIONS

A heteroaromatic monomer is an aromatic compound containing a heteroatom in the conjugated ring system and is isoelectronic with the original aromatic hydrocarbon [F. Carey, R. Sundberg, *Advanced Organic Chemistry, Third Ed., Part A*, Plenum Press, New York (1990) p. 531]. Atoms other than a carbon (heteroatoms) include nitrogen, sulfur, oxygen, selenium and tellurium. Heteroaromatic monomers comprise pyrroles, thiophenes, selenophenes tellurophenes, furans, indoles, isoinoles, isothianaphthalenes, pyridines, pyrimidines, pyrazines, thienothiophenes, triazines, thiazoles, imidazoles, quinolines, isoquinolines, benzimidazoles, thiazoles, triazoles, oxidiazoles, benzopyrrolines, dithienobenzene, thianaphtene, carbazoles, benzothiophenes, isobenzothiophenes, benzofurans, isobenzofurans, isoindolines, isobenzoselenophenes isobenzotellurophenes, their substituted derivatives, or mixtures thereof.

Some heteroaromatic monomers and their substituted derivatives of this invention are illustrated in Formula 1.

Heteroaromatic monomers

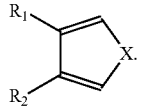

Formula 1

X = NH, NR, S, O, Se, Te where R, $R_1$ or $R_2$ are selected independently of one another and may be the same or different groups including hydrogen, deuterium, halogens, alkyl, fluoroalkyl, halogenated alkyl, alkenyl, alkoxy, carboxylate, alkylcarbonyl, alkanoyl, alkylthio, mercapto, cycloalkoxy, alkenyldioxy, aryl, alkylaryl, arylalkyl, aryloxy, amino, alkylamino, dialkylamino, alkylcarbonylamino, alkylsulfinyl, aryloxyalkyl, alkoxylalkyl, polyetheralkyl, phosphate, phosphite, phosphine, hydroxyl, cyano, sulfonate, alkylsulfonate, arylsulfonate, alkylsulfate, arylsulfate, nitro, alkylsilane, arylsilane, wherein any of the listed groups that can carry substituents can be optionally substituted, or $R_1$ and $R_2$ together form an alkylene, alkenylene, alkenyloxy, alkenyldioxy, alkynyloxy, alkynyldioxy chain that completes a 3-, 4-, 5-, 6-, 7- or 8-membered alicyclic or aromatic ring which can optionally include one or more heteroatoms, including nitrogen, oxygen, sulfur, phosphorous, selenium, tellurium, or silicon and wherein the ring formed is optionally substituted. R, $R_1$ or $R_2$ can also be an oligomeric or polymeric chain made by repeating one or more monomers, including among others-glycols, ethers, fluoroethers, olefins, fluoroolefins, acrylates and methacrylates, vinyl compounds, alkynes, esters, amino acids, lactones and lactams, polyols, urethanes, epoxies, hydroxyacids, dienes, polyenes, chloroolefins, diols, diamines, and polyamines. In specific embodiments, $R_1$ and $R_2$ together form an alkylene, alkenylene, alkenyloxy, alkenyldioxy, alkynyloxy, alkynyldioxy chain that completes a 3-, 4-, 5-, 6-, 7- or 8-membered alicyclic or aromatic ring which can optionally include one or more heteroatoms, including nitrogen, oxygen, or sulfur.

Substituents for optional substitution of the groups herein can include any and all non-hydrogen functional groups that are stable to polymerization conditions and which do not disrupt the polymerization reaction. Optional substituents specifically can be selected from halogens, particularly fluorine, alkyl groups, alkenyl groups, alkynyl groups, aryl groups, phenyl groups, benzyl groups, fluoroalkyl groups, fluoroaryl groups, fluorophenyl groups, fluorobenzyl groups, perfluorinated alkyl groups; perfluorinated aryl groups, perfluorinated phenyl groups, alkoxy groups, nitro groups, cyano groups, isocyano groups, thiocyano groups, amino groups (NH$_2$ or NR$_2$, where R is defined above), ester groups, acyl groups, ether groups, polyether groups, thioether groups, thiol groups, azide groups, carboxylate groups alkylcarbonyl groups, alkanoyl groups, alkylthio, cycloalkoxy, alkenyldioxy, aryl, alkylaryl, arylalkyl, aryloxy, amino, alkylamino, dialkylamino, alkylcarbonylamino, alkylsulfinyl, aryloxyalkyl, alkoxyalkyl, polyetheralkyl, phosphate, phosphite, phosphine, hydroxyl, sulfonate, alkylsulfonate, arylsulfonate, alkylsulfate, arylsulfate, alkylsilane, and arylsilane. It is understood that certain substituent groups may be reactive under polymerization conditions, in this case one of ordinary skill in the art can select protective groups which will prevent reaction at those reactive substituents under the conditions of the polymerization reaction. Appropriately protected substituent groups can be employed in the intermediates and other materials of this invention. In specific embodiments, substituents include one or more fluorines, one or more alkyl groups (particularly small alkyl groups having 1-6 carbon atoms).

The poly(heteroaromatic) blocks comprise polymers made by polymerization of one or more heteroaromatic monomers, particularly those listed above. The conducting sections of the conducting block copolymers of this invention preferably have 3 or more polymerized monomers (n=3 or more in certain formulas herein). In more preferred embodiments, the conducting sections have 8 or more repeating units (i.e., monomer units). Block copolymers of this invention also include those having from 5 to about 500 monomers, those having 5 to about 100 monomer units and those having 5 to about 50 monomer units. In each case the conducting sections can contain one or more different monomer units, but preferred block copolymers have conducting sections in which all of the monomers are the same. Conducting blocks containing one or more selected heteroaromatic monomers can be combined by the methods herein to form block copolymers with conducting blocks that contain one or more different selected heteroaromatic monomer.

The non-conducting sections of the block copolymers of this invention include, among others, polyethers, poly(fluoroethers), polyglycols, polyacetals, polyolefins, polystyrene and its copolymers, polyfluoroolefins, polyoxides, polychloroolefins, polychlorofluoroolefins, polysiloxanes, polyesters, polybromoesters, natural and synthetic rubbers (vulcanized or un-vulcanized), polyacids, polycarbonates, polyanhydrides, polysulfides, polyamides, polyamines, polyimides, vinyl polymers and polymers derived from the polymerization of unsaturated monomers, polyacrylates and polymethacrylates, polyacrylonitriles and its copolymers, polybutadiene and its copolymers, alkyds, polyalcohols, polyurethanes, epoxies, cellulose and its derivatives, starch and its derivatives, other natural occurring polymers, polypeptides, and other biomolecules and combinations and copolymers thereof.

The molecular weight of the block copolymer preferably ranges from 40 Daltons to about 1 million Daltons. In more preferred embodiments the non-conducting blocks (B) of the block copolymers of this invention contain 1 to about 100 repeating units and the conducting block/s (A) contain 3 to about 500 repeating units.

The non-conducting block B is modified at one end or at both ends with a linkage group that undergoes oxidation under the conditions used to polymerize the heteroaromatic monomer. Linkage groups include among others aliphatic acids, aromatic amino groups, phenols, substituted thiophenes, pyrroles, furan species and their derivatives, carbonyl compounds, quinones, halogenated compounds, acetylenes, phosphorous containing compounds, thiols, and other species that undergo oxidation.

The linkage group is bonded to the non-conducting polymer during the first step of the synthesis, preferably through a covalent bond. The covalent bond between the non-conducting block and the linkage group may be an ester, thioester, amide, ether, thioether, amino, carbon-carbon, sulfonic ester, sulfonamide, phosphate ester, anhydride, urea, urethane, carbonate, imine, imide, thiocarbonate, thiourethane or thiourea linkage. In a preferred embodiment of this invention the non-conducting block a 3,4-ethylenedioxythiophene unit is reacted with n-butyllithium to form a carbanion and this species is linked to conducting block via ring opening of an epoxy ring (see Example 1).

The modified non-conducting block (with one or more terminal linkage groups) is then copolymerized with one or more heteroaromatic monomers (second step of the synthesis). Copolymerization occurs by chemical or electrochemical oxidation of the monomers.

Preferred block copolymers of this invention are dispersible in selected solvents to facilitate processing of the copolymers. A fully dispersible material is a material that forms a stable suspension of droplets, micelles, or colloidal particles in a liquid medium such as water, an organic solvent or a mixture thereof at a concentration of at least 0.1% wt., but more preferably between 0.2 and 1.5 wt. %. The droplets, micelles or colloidal particles are stable under the force of gravity and the dispersed material does not precipitate or separate out of the liquid medium over a time period that significantly interferes with the use of the dispersed material. Preferably the material does not precipitate or separate out of the liquid medium within a one-month period after the dispersion is formed, but more preferably after a 3-month period and yet more preferably after a 6-month period.

ICP dispersions of this invention exhibit increased useful shelf-life and provide increased product consistency over that lifetime. For example, films and coatings formed from dispersions of this invention that have been stored for up to six months exhibit non-substantial differences in optical properties and electrical conductivity compared to films and coating formed from freshly made dispersions. Thin films formed from preferred dispersions of this invention stored for up to six months, for example, by spin-coating on glass, will exhibit less than a 20% difference in optical transmittance over the visible spectrum compared to thin films prepared from a freshly made sample of the same dispersion. Thin films formed from more preferred dispersions of this invention stored for up to six months, for example, by spin-coating on glass, will exhibit less than a 10% difference in optical transmittance over the visible spectrum compared to thin films prepared from a freshly made sample of the same dispersion. Thin films formed, for example, by spin-coating on glass, from preferred dispersions of this invention stored for up to six months, will exhibit a difference of less than 50% difference in surface resistivity compared to thin films prepared from a freshly made sample of the same dispersion. Thin films formed, for example, by spin-coating on glass, from more preferred dispersions of this invention stored for up to six months, will exhibit a difference of less than 25% difference in surface resistivity compared to thin films prepared from a freshly made sample of the same dispersion. Most preferred dispersions can be used freshly after production or after up to six months of storage to produce thin films which exhibit less than about a 5% difference in optical transmittance as defined above and less than about a 10% difference in surface resistivity as defined above.

Thin films and coatings on substrates are prepared from the dispersions of this invention employing conventional methods. For example, spin-coating methods can be employed. In preferred methods for preparation of thin-films and coatings, and for other applications of the dispersions herein, the dispersions are treated by ultrasonication and filtered through loosely agglomerated glass wool just prior to their use.

A material is dispersible in a liquid medium if it substantially disperses. As used herein the term "dispersible" encompasses materials where small amounts of the material may not disperse in the selected liquid medium, but wherein the amount of material that does not disperse does not significantly interfere with processability of the material or the use or application of the dispersion. A filtering step can be optionally employed to remove undesirably large non-dispersed particles from dispersions.

Chemical polymerization can be performed in the presence of an oxidizing agent comprising one or more of the following: hydrogen peroxide; organic or inorganic peroxides; persulfates; peracids; peroxyacids; hypobromite; bromates; hypochlorite; chlorates; perchlorates; periodates; organic or inorganic salts of iron (III), chromium (IV), chromium (VI), manganese (VII), manganese (V), manganese (IV), vanadium (V), osmium (VIII), ruthenium (IV), mercury (II), copper (II), lead (IV), molybdenum (VI); gases such as oxygen, ozone, chlorine, bromine, $SO_2$, $SO_3$, $NO_2$; organic oxidants such as formic acid, oxalic acid, oxalyl chloride, acetic anhydride, trifluoroacetic anhydride, and substituted or unsubstituted quinones. Preferred oxidizing agents of this invention are iron(III) salts such as ferric perchlorate, feric paratoluensulfonate, and ferric triflate.

The polymerization reaction is carried out in a solvent or mixture of solvents which can include water, alcohols, glycols, alkoxyalcohols, ketones, esters, linear and cyclic ethers, alkoxyethers, chlorinated solvents, carbonates, nitrites, amides, sulfoxides, hydrocarbon and aromatic solvents and mixtures thereof. Preferred solvent mixtures are those in which the components of the mixture at the amounts at which they are combined are miscible. Preferred polymerization solvents of this invention are polar aprotic solvents or mixtures of such solvents, including, among others, acetonitrile, propionitrile, benzonitrile, nitromethane, nitroethane, acetone, methylethylketone, chloroform, dimethylsulfoxide, N,N-dimethylformamide, N-methylpyrrolidone, or propylene carbonate. A more preferred solvent is acetonitrile.

The polymerization is typically carried out at a temperature between −80 deg C. and the boiling point of the solvent used. Polymerization conditions can be controlled to control the size of polymers formed as is known in the art. Polymerization may be carried out in the presence of an organic or inorganic acid or salts, thereof.

The copolymerization reaction (step two of the synthesis) is preferably carried out with molecular oxygen, ozone, a peroxide, hydrogen peroxide, a persulfate or an iron(III) salt. Preferably an organic acid or its salt is present during the polymerization. Preferred organic acids include para-toluenesulfonic acid, dodecylbezensulfonic acid, poly(styrenesulfonic acid), di-nonylnaphtalenesulfonic acid, and mon- and dialkyl sulfosuccinates. Preferred solvents for the copolymerization are water, butanol, pentanol, ethoxyethanol, butoxyethanol, acetonitrile, propionitrile, chloroform, THF, acetone, methylethylketone, propylene carbonate, N-methylpyrrolidone, nitromethane, and mixtures thereof. Preferred reaction temperature is between −20 deg C. and 80 deg C.

A wet gel according to this invention is a mixture of a ICP copolymer and a solvent, and more specifically a mixture of a poly(heteroaromatic) block copolymer and a solvent, where the concentration of the poly(heteroaromatic) block copolymer ranges between about 3 and about 20 wt. % and the viscosity of the mixture is such that free flowing does not occur at room temperature and in the absence of shear.

When a group of substituents is disclosed herein, it is understood that all individual members of those groups and all subgroups, including any isomers and enantiomers of the group members, and classes of compounds that can be formed using the substituents are disclosed separately. When a Markush group or other grouping is used herein, all individual members of the group and all combinations and subcombinations possible of the group are intended to be individually included in the disclosure. When a compound is described herein such that a particular isomer or enantiomer of the compound is not specified, for example, in a formula or in a chemical name, that description is intended to include each isomers and enantiomer of the compound described individual or in any combination. It will be understood that for any chemical species of this invention, any stable or radioactive isotopic form of that species, unless otherwise stated, is intended to be included in the invention. One or more hydrogens, for example, can be replaced with deuterium or tritium. One or more atoms in the chemical species may be enriched in any stable or radioactive isotope of that atom. Radioactively-labeled or isotopically-labeled species may be employed in tracing studies, and in other scientific research. Specific names of compounds are intended to be exemplary, as it is known that one of ordinary skill in the art can name the same compounds differently. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure.

All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art. For example, when a compound is claimed, it should be understood that compounds known in the art including the compounds disclosed in the references disclosed herein are not intended to be included in the claim.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

The invention illustratively described herein suitably may be practiced in the absence of any element or elements, limitation or limitations which is not specifically disclosed herein.

One of ordinary skill in the art will appreciate that starting materials, reagents, solid substrates, synthetic methods, purification methods, and analytical methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All references cited herein are hereby incorporated by reference to the extent that there is no inconsistency with the disclosure of this specification. Some references provided herein are incorporated by reference to provide details concerning sources of starting materials, additional starting materials, additional reagents, additional methods of synthesis, additional methods of analysis and additional uses of the invention.

EXAMPLES

Example 1

Production and Purification of poly(EDOT-block-EG 1098) (ABAB-Type Multi-Block Copolymer)

Synthesis of di-EDOT-Terminated Polymeric Block (PEG$_{1098}$dEDOT)

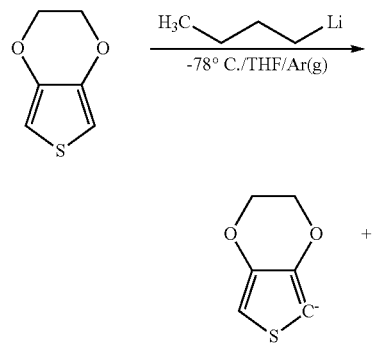

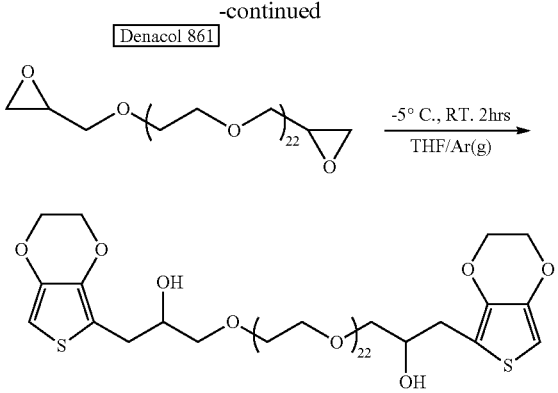

3,4-Ethylenedioxythiophene (EDOT, 7.15 g, 0.05 mol, 1 eq) in 150 mL of tetrahydrofuran (THF) was added to an oven dried 3-neck round bottom flask and cooled in an isopropanol/liquid nitrogen bath. An oven dried glass syringe was flashed with argon until cool, then used to transfer 20 mL of 2.5 M n-butyllithium (0.05 mol, 1 eq) to the stirring solution, the color of which changed to pale yellow after the addition of n-butyllithium. The stirred mixture was allowed to warm up to −10 deg.C. Meanwhile, Denacol 861 (Nagase Corporation, 6.86 g 0.00625 mol, 0.125 eq) was purged with argon, then dissolved with ca. 30 mL of THF under stirring and/or sonication. The Denacol solution was transferred to a dropping funnel via cannula and added slowly to the reaction flask at 5 deg.C. The mixture was stirred for ca. 2.5 hours at room temperature. A precipitate formed upon the addition of the Denacol solution and the color turned to orange-yellow by the end of stirring time. The reaction was then quenched with cold 1 M HCl (pH~3) and most of the THF was removed by rotary evaporation to give a brown oil. The oil was extracted three times with dichloromethane and the organic layer was washed with 0.1 M HCl (3 times) followed by a final wash with DI water. The organic layer was then dried over anhydrous magnesium sulfate and the remaining solvent removed under vacuum.

Copolymerization of EDOT and PEG$_{1098}$dEDOT

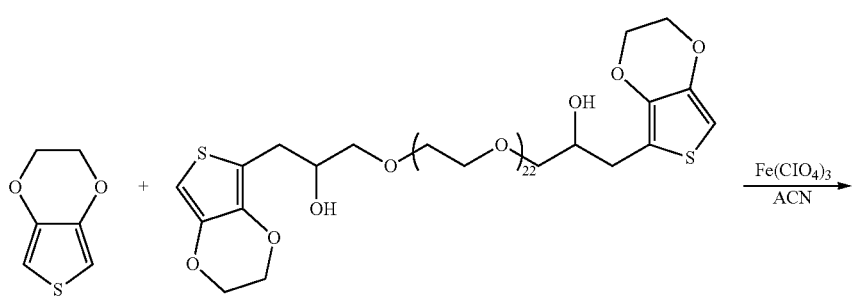

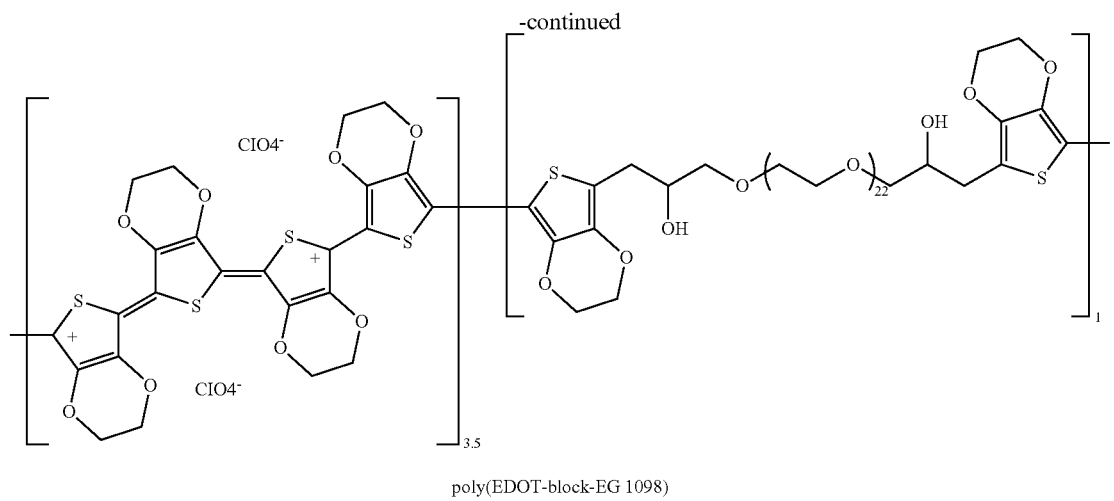

poly(EDOT-block-EG 1098)

Iron(III) perchlorate hydrate (11.36 g, 32.1 mmol, violet crystals) was dissolved in 300 mL of acetonitrile (0.11 M solution, ACN) in a 500 mL Erlenmeyer flask to form an oxidant solution. The monomer EDOT (1.509 g, 10.6 mmol) and $PEG_{1098}dEDOT$ (3.07 g) were mixed in a vial and diluted with 10 mL of acetonitrile. This monomer mixture was then added to the stirring oxidant solution. The vial was rinsed with acetonitrile and added to the reaction mixture. The color of the mixture changed immediately from red-orange to blue-green, then over the next 30 minutes the color changed from blue-green to blue. After allowing this mixture to react for 50 hours at room temperature, the product was isolated and purified by centrifuging the crude copolymerization mixture at 3000 RPM for 8 minutes. The centrifugation was followed by decanting solvent from the gel formed and washing the gel with acetonitrile and forming a new suspension that was again centrifuged. This process was repeated 3 times. The color of the supernatant ranged from green to greenish-blue to blue for the three rinses, respectively. The product was isolated as a wet viscous gel with 7.4 wt. % solids and had a dark blue color. The pressed pellet DC conductivity of the solid content of the gel was found to be 0.8 S/cm using standard four-probe conductivity measurement techniques.

Example 2

Production and Purification of poly(EDOT-block-EG 1098) (ABAB-Type Multi-Block Copolymer)

Iron(III) perchlorate hydrate (15.09 g, 43 mmol, violet crystals) was dissolved

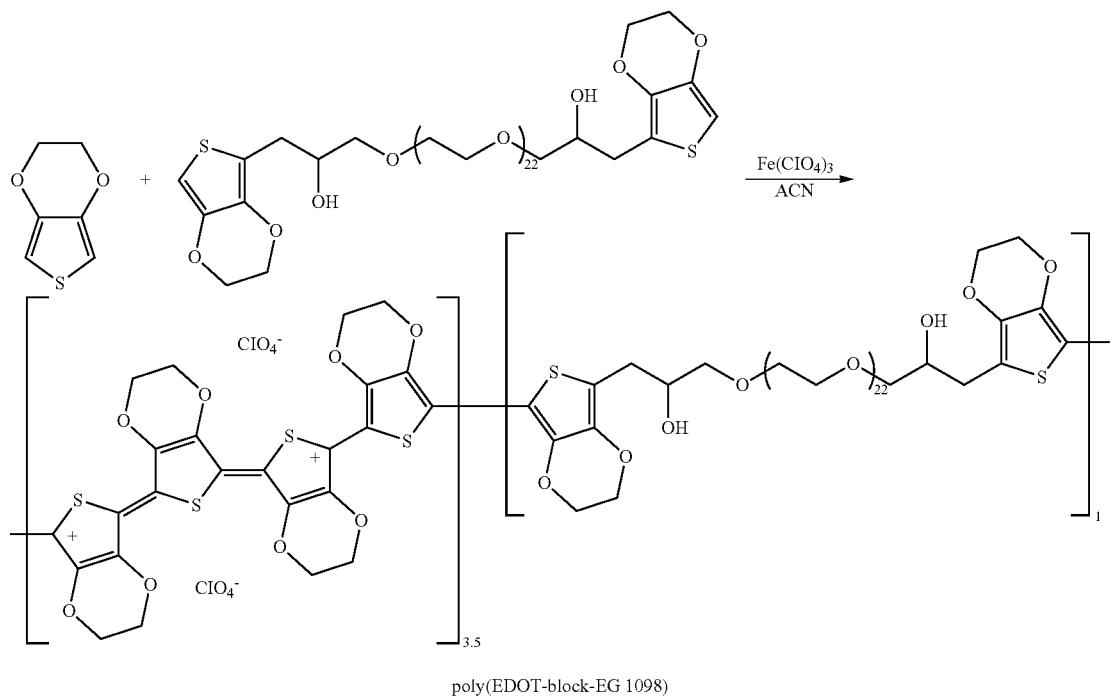

poly(EDOT-block-EG 1098)

in 426 mL of acetonitrile (0.1 M solution) in a 1000 mL Erlenmeyer flask to form an oxidant solution. The monomer EDOT (2.04 g, 14.4 mmol) and PEG1098dEDOT (4.02 g) were mixed in a vial and diluted with 15 mL of acetonitrile. This monomer mixture was then added to the stirring oxidant solution. The vial was rinsed with acetonitrile and added to the reaction mixture. The color of the mixture changed immediately from reddish-orange to blue. After allowing this mixture to react for 72 hours at room temperature, the product was isolated and purified by centrifuging the crude copolymerization mixture at 2400 RPM for 7 minutes. The centrifugation was followed by decanting supernatant from the gel formed and washing the gel with acetonitrile and forming a new suspension that was again centrifuged. This process was repeated three times rinsing with acetonitrile and once with propylene carbonate for the final rinse. The color of the supernatant ranged from green to blue for the acetonitrile rinses. This process resulted in 68.2 g of purified product that was isolated as a wet viscous gel having 3.9 wt. % solids with a dark blue color. The pressed pellet DC conductivity of the solid content of the gel was found to be 0.43 S/cm using standard four-probe conductivity measurement techniques.

Example 3

Production and Purification of $C_{12}PEG_{870}$-poly(block-EDOT)-C12PEG870 (BAB-Type Tri-Block Copolymer)

Synthesis of mono-EDOT-Terminated Polymeric Block ($C_{12}PEG_{870}$-EDOT)

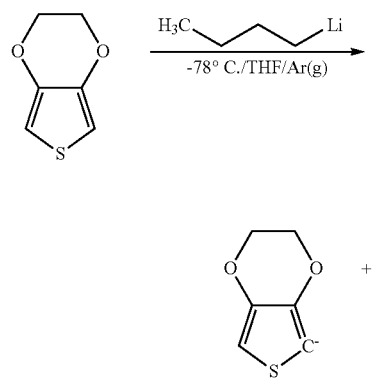

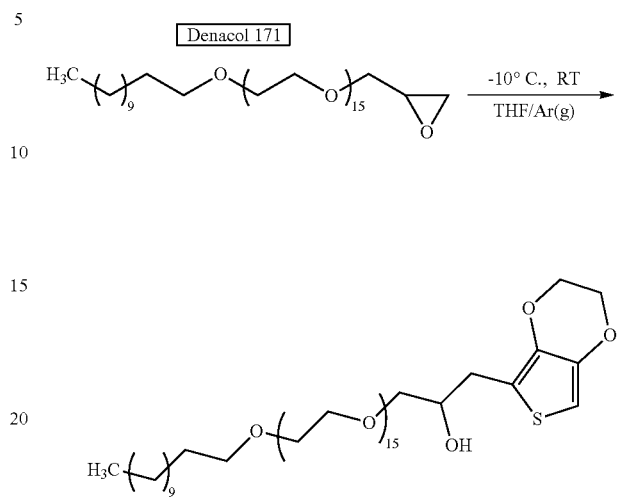

Under argon, EDOT (10.65 g, 75 mmol) was diluted in 200 mL of anhydrous THF and cooled using an isopropanol/liquid nitrogen slurry. N-butyllithium (30 mL, 75 mmol) was added slowly to this cooled mixture. Decacol Ex-171 (8.156 g, 9.37 mmol) was dissolved first with ca. 35 mL THF, then added dropwise to the lithiated EDOT at −10° C. The mixture was stirred in the cold-bath for 2 hours, and then was allowed to come to room temperature with continued stirring overnight. The reaction was quenched with cold 1 M HCl. The organic solvent was reduced under vacuum, and extracted with dichloromethane 3 times. These organic phases were combined and washed with 0.1 M HCl 3 times, then DI water for the final rinse. The washed organic layer was dried over anhydrous magnesium sulfate, and then the solvent was removed under vacuum. The product was isolated as a viscous oil that became a waxy solid on standing. $^1$H NMR recorded in CDCl$_3$. δ 2.80 (s, 2H); 4.14 (s, 41.7H); 6.1 (s, 0.66H); 6.3 (s, 17.33); 1.56 (m, 2.24H); 1.25 (s, 30.49), 0.87 (t, 4.70H).

Copolymerization of EDOT and $C_{12}PEG_{870}$-EDOT

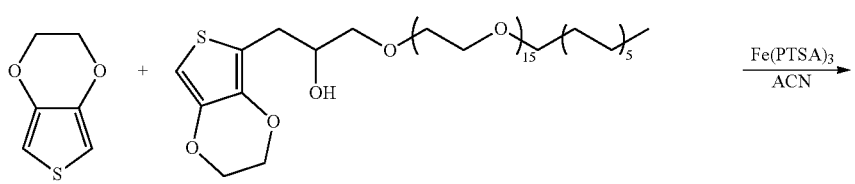

-continued

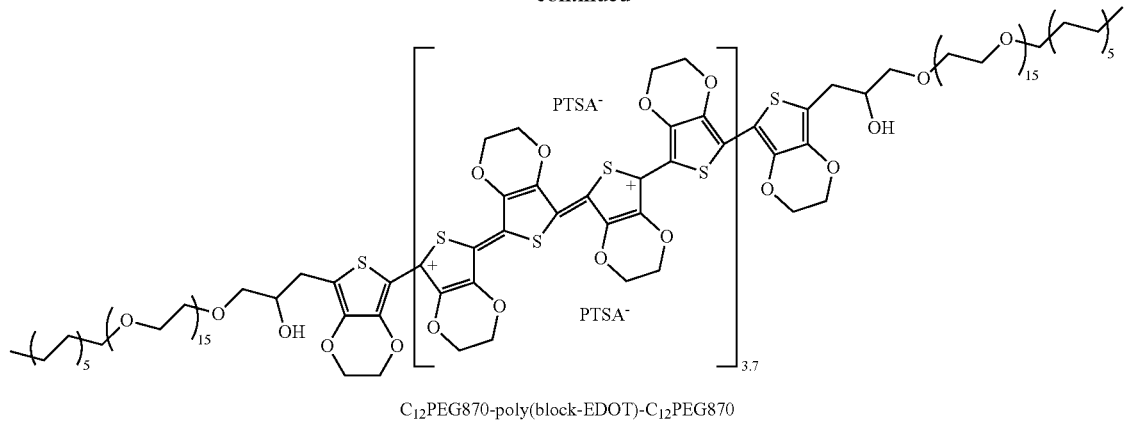

C$_{12}$PEG870-poly(block-EDOT)-C$_{12}$PEG870

Iron(III) p-toluenesulfonate (8.29 g, 13.3 mmol, yellow-orange powder) was dissolved in 120 mL of acetonitrile (0.11 M solution) in a 250 mL Erlenmeyer flask to form an oxidant solution. The monomer EDOT (0.71 g, 50 mmol) and C12PEG870-EDOT (0.70 g, 0.67 mmol) were mixed in a vial and diluted with 10 mL of acetonitrile. This monomer mixture was then added to the stirring oxidant solution. The vial was rinsed with acetonitrile and added to the reaction mixture. The color of the mixture changed slowly from yellow-orange to yellow-green to green to blue-green to blue over a period of several hours. After allowing this mixture to react for 48 hours at room temperature, the product was isolated and purified by centrifuging the crude copolymerization mixture at 2400 RPM for 7 minutes. The centrifugation was followed by decanting supernatant from the gel formed and washing the gel with ethanol and forming a new suspension that was again centrifuged. This process was repeated three times. The color of the supernatant ranged from green to blue for each of the successive rinses. This resulted in 72% yield of purified product that was isolated as a wet viscous gel with a dark blue color and 3.4 wt. % solids. The pressed pellet DC conductivity of the solid content of the gel was found to be $7.5 \times 10^{-2}$ S/cm using standard four-probe conductivity measurement techniques.

Example 4

Production and Purification of C12PEG870-poly(block-EDOT)-C12PEG870 (BAB-Type Tri-Block Copolymer)

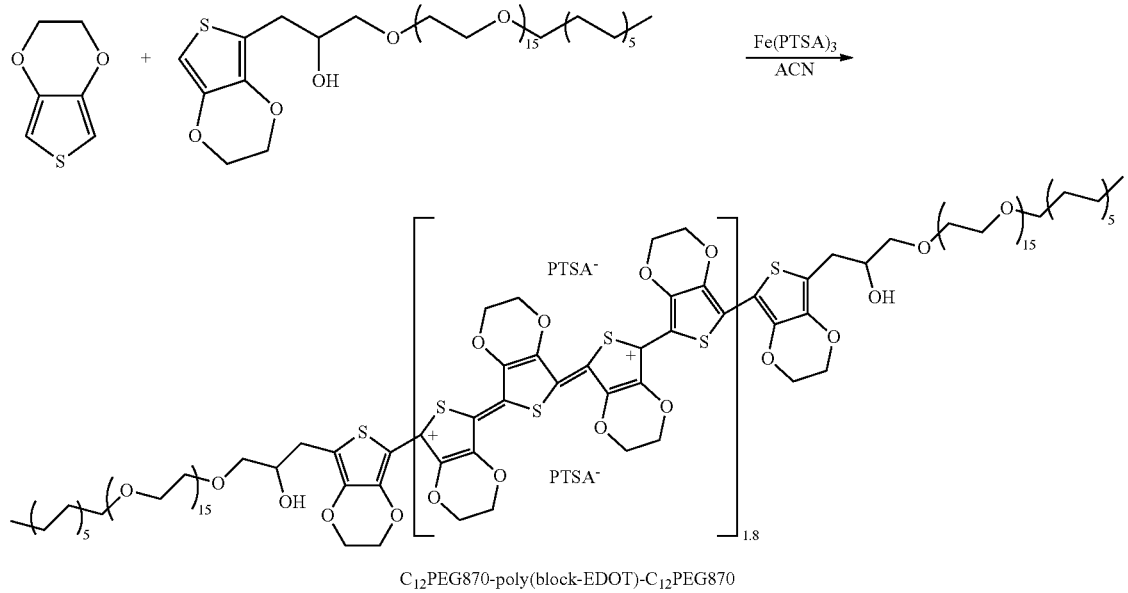

C$_{12}$PEG870-poly(block-EDOT)-C$_{12}$PEG870

Iron(III) p-toluenesulfonate (7.44 g, 11.9 mmol, yellow-orange powder) was dissolved in 90 mL of acetonitrile (0.13 M solution) in a 250 mL Erlenmeyer flask to form an oxidant solution. The monomer EDOT (0.50 g, 3.5 mmol) and C12PEG870-EDOT (1.0 g, 1.0 mmol) were mixed in a vial and diluted with 10 mL of acetonitrile. This monomer mixture was then added to the stirring oxidant solution. The vial was rinsed with acetonitrile and added to the reaction mixture. The color of the mixture changed slowly from yellow-orange to yellow-green to green to blue-green to blue over a period of several hours. During this time the reaction mixture became viscous, and a 20 mL portion of acetonitrile was added to reduce its viscosity. After allowing this mixture to react for 48 hours at room temperature, the product was isolated and purified by centrifuging the crude copolymerization mixture at 2400 RPM for 7 minutes. The centrifugation was followed by decanting supernatant from the gel formed and washing the gel with ethanol and forming a new suspension that was again centrifuged. This process was repeated three times. The color of the supernatant ranged from green to blue for each of the successive rinses. This resulted in 63% yield of purified product that was isolated as a wet viscous gel with a dark blue color and 5.1 wt. % solids. The pressed pellet DC conductivity of the solid content of the gel was found to be $7.6 \times 10^{-4}$ S/cm using standard four-probe conductivity measurement techniques.

Example 5

Production and Purification of $C_{12}$PEG870-poly (block-EDOT) $C_{12}$PEG870 (BAB-Type Tri-Block Copolymer)

Iron(III) p-toluenesulfonate (4.80 g, 7.7 mmol, yellow-orange powder) was dissolved in 66 mL of acetonitrile (0.12 M solution) in a 250 mL Erlenmeyer flask to form an oxidant solution. The monomer EDOT (0.21 g, 1.5 mmol) and C12PEG870-EDOT (1.06 g, 1.0 mmol) were mixed in a vial and diluted with 10 mL of acetonitrile. This monomer mixture was then added to the stirring oxidant solution. The vial was rinsed with acetonitrile and added to the reaction mixture. The color of the mixture changed slowly from yellow-orange to yellow-green to green to blue-green to blue over a period of several hours. After allowing this mixture to react for 48 hours at room temperature, the product was isolated and purified by centrifuging the crude copolymerization mixture at 2400 RPM for 7 minutes. The centrifugation was followed by decanting supernatant from the gel formed and washing the gel with ethanol and forming a new suspension that was again centrifuged. This process was repeated three times. The color of the supernatant ranged from green to blue for each of the successive rinses. This resulted in 49% yield of purified product that was isolated as a wet viscous gel with a dark blue color and 5.7 wt. % solids. The pressed pellet DC conductivity of the solid content of the gel was found to be $4.6 \times 10^{-6}$ S/cm using standard four-probe conductivity measurement techniques.

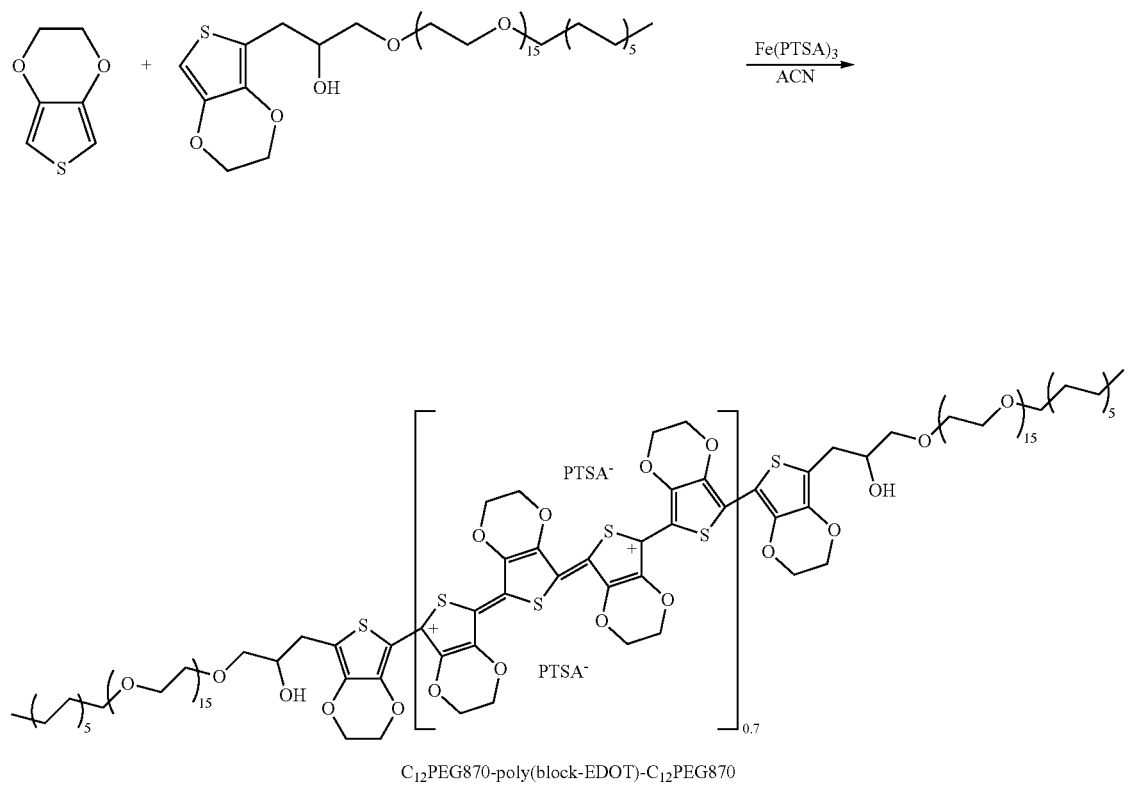

$C_{12}$PEG870-poly(block-EDOT)-$C_{12}$PEG870

Example 6

Production and Purification of poly(EDOT-block-PDMS 5k) (ABAB-Type Multi-Block Copolymer)

Synthesis of di-EDOT-Terminated Polymeric Block (PDMS$_{5k}$dEDOT)

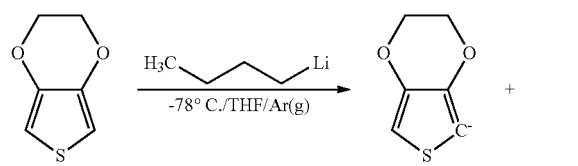

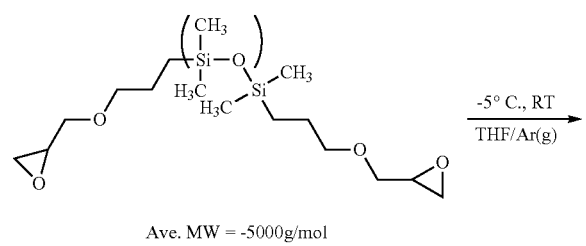

Ave. MW = ~5000 g/mol

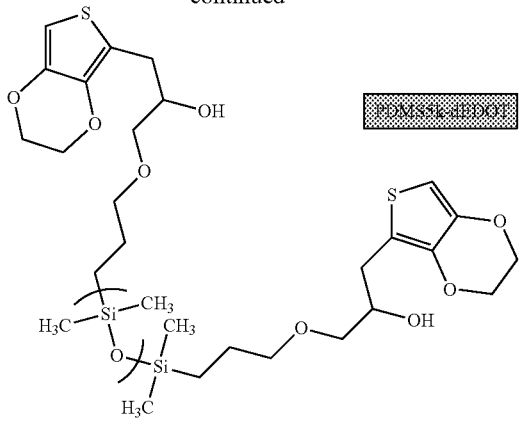

Under argon, EDOT (3.59 g, 25 mmol) was diluted with 100 mL anhydrous THF and cooled in an isopropanol/liquid nitrogen slurry. N-butyllithium (10 mL, 25 mmol) was added slowly to the cooled mixture. DMS-E21, an epoxypropoxypropyl terminated polydimethylsiloxane (structure shown above, Gelest, 15.716 g, 3.14 mmol) was diluted with 10 mL THF, then added dropwise to the lithiated EDOT at −10° C. The mixture was stirred in the cold-bath for ca. 2 hours, and then was allowed to come to room temperature with continued stirring overnight. The reaction was quenched with cold 1 M HCl. The organic solvent was reduced under vacuum, and the mixture was extracted with dichloromethane 3 times, the extract washed with 0.1 M HCl 3 times, and then DI water for the final wash. The organic layer was dried over anhydrous magnesium sulfate, and then the solvent was removed under vacuum. The product (shown above) was isolated as a viscous oil.

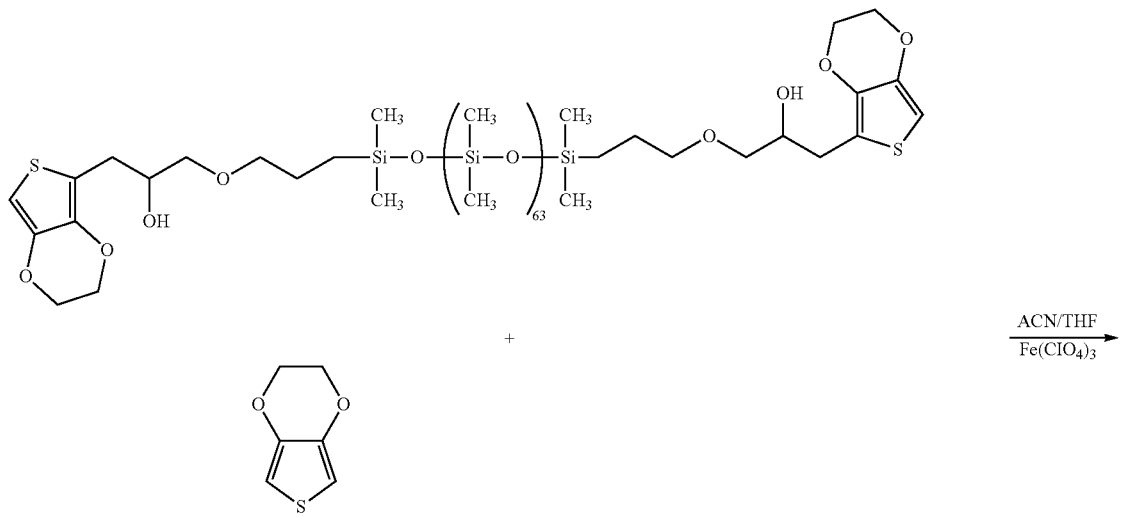

-continued

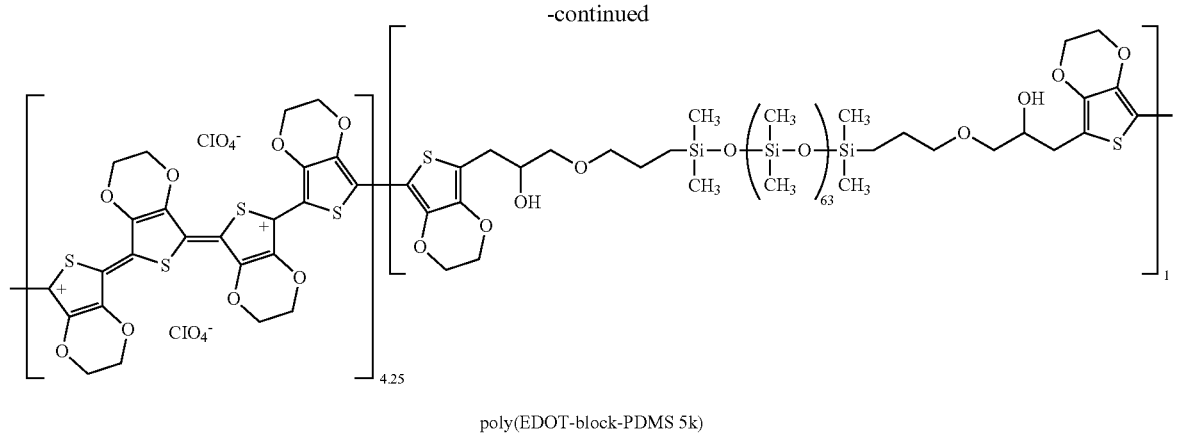

poly(EDOT-block-PDMS 5k)

Iron(III) perchlorate hydrate (1.59 g, 4.5 mmol, violet crystals) was dissolved in 45 mL of acetonitrile mixed with 22 mL of tetrahydrofuran (0.07 M solution) in a 250 mL Erlenmeyer flask to form an oxidant solution. The monomers EDOT (0.26 g, 1.8 mmol) and PDMS5k-dEDOT (1.00 g) were mixed in a vial and diluted with 5 mL of tetrahydrofuran. This monomer mixture was then added to the stirring oxidant solution. The vial was rinsed with acetonitrile and added to the reaction mixture. The color of the mixture-changed rapidly from red-orange to blue-green to blue over a period of 30 minutes. After allowing this mixture to react for 48 hours stirring at room temperature, the product was isolated and purified by centrifuging the crude copolymerization mixture at 3000 RPM for 15 minutes. The centrifugation was followed by decanting supernatant from the gel and washing the gel with acetonitrile. This process was repeated four times. The color of the supernatant ranged from yellow-brown to yellow-green to green to blue for each of the successive rinses. This resulted in purified product that was isolated as a wet viscous gel with 3.1 wt. % solids and a dark blue color. The pressed pellet DC conductivity of the solid content of the gel was found to be 14 S/cm using standard four-probe conductivity measurement techniques.

Example 7

Chemical Analysis of the Centrifugation Purification Process of a poly(EDOT-block-EG 1098) Gel Poly(EDOT-block-EG 1098) gel samples were obtained after each

TABLE 1

Elemental analysis of ICP gels at each step of the purification process.

| Sample Description | Chlorine Content (ppm) | Iron Content (ppm) |
| --- | --- | --- |
| raw product | 6310 | 3410 |
| first rinse | 2900 | 700 |
| second rinse | 2200 | 100 |
| third rinse | 2310 | 19 | centrifugation step for a sample prepared according to the procedure in Example 1. Table 1 shows the elemental analysis data (Huffman Laboratories, Inc.) obtained for the raw copolymer product after each acetonitrile rinse. Iron and chlorine were measured to detect the contamination from the spent or residual oxidant and to determine the doping level of the conducting polymer portion of the material. The data show that iron levels are steadily lowered with each successive rinse, with three rinses reducing the final concentration of iron to 19 ppm. As expected, chlorine levels drop with the initial rinses, but remain constant for later rinses. This is consistent with the loss of spent ferrous perchlorate while retaining a doping level of perchlorate in the oxidized ICP blocks of the polymer. Based on the monomer feed ratio of EDOT to EG repeat units, we calculate a doping ratio of 24%. Said another way, one out of every four EDOT repeats is oxidized (positively charged) and has a perchlorate anion associated with it.

Example 8

Filtration-Based Purification Method for a Crude Mixture Containing poly(EDOT-block-PDMS 5k)

Poly(EDOT-block-PDMS 5k) was prepared according to the procedure in Example 6, with the exception that the purification was carried out using a solvent-resistant, stirred filtration cell (Millipore). The stirred filtration cell was fitted with a nylon net filter (20 micron pores, Millipore), magnetic stirring, and could be pressurized to 40 psi with dry argon gas to effect rapid filtration. This apparatus was filled at ambient pressure with 100 mL of a crude copolymerization mixture prepared as described in Example 6. Pressure (40 psi) was applied to the sealed apparatus until the copolymer get became highly viscous and stirring became difficult. The resulting filtrate was yellow and was free of deep blue particles. At this time the pressure was relieved and 150 mL of methyl-n-propylketone was added. This mixture was allowed to stir for 15 minutes under ambient pressure. Pressure (40 psi) was then reapplied until the copolymer gel had again become concentrated. This filtration and washing procedure was repeated with another 150 mL of methyl-n-propylketone and thereafter was filtration and washing was repeated two times with 150 mL aliquots of acetonitrile. The yellow color of the filtrate became weaker with each successive rinse, and on the final rinse the filtrate was colorless. The resulting deep blue poly(EDOT-block-PDMS 5k) gel was measured to be 8.4 wt. % solids.

Example 9

Processing of a poly(EDOT-block-EG 1098) Purified Gel to Prepare a Nitromethane, N-methylpyrrolidone, or Propylene Carbonate Dispersion Nitromethane (2.9 g) was mixed with 0.535 g of poly (EDOT-block-EG 1098) gel (9.3 wt. % solids) prepared according to the procedure given in Example 1 to form a nitromethane dispersion with 1.45 wt. % solids concentration. The same batch of poly(EDOT-block-EG 1098) gel was also used to prepare dispersions in N-methylpyrrolidone and propylene carbonate. N-methylpyrrolidone (2.6 g) was mixed with 0.503 g of gel to form a dispersion with 1.51 wt. % solids concentration. Propylene carbonate (2.9 g) was mixed with 0.54 g of gel to form a dispersion with 1.47 wt. % solids concentration. These dispersions were ultrasonically processed using a Fisher Scientific 500 Watt sonic piezo horn (with microtip attached) immersed into the dispersion 1 cm below the surface. The amplitude was set to 40% and the sample was processed for 30 seconds. This sonication was repeated 2 more times with recapping and shaking the sample between each sonication step. These samples were filtered by gravity through loosely packed glass wool to remove any remaining large particles.

The particle size of the nitromethane dispersion was analyzed using a Zetasizer Nano ZS (Malvern Instruments) particle size analyzer. The number average particle size was found to be 1 micron and 600 nm for two samples (prepared according to the method in Example 1) after 1 minute of sonication using a 500 W ultrasonic probe-(Fisher) (FIG. 2). The particle size distribution was narrow with polydispersity indices of 0.33 and 0.29 for the 1 micron and 600 nm sized samples respectively.

Thin films of the nitromethane dispersion were prepared by spin casting with a Chemat Technology KW-4A model spin coater equipped with a 2.5 cm diameter vacuum chuck. Film thicknesses were varied by spinning Corning® glass substrates at different speeds. The optical transmittance of the films was measured with a Hewlett Packard diode array UV-vis spectrophotometer and the surface resistivity (or sheet resistance) of the sample was measured using the square method according to ASTM D-257. FIG. 1 shows that a film obtained by spin casting a single coating of the dispersion at 500 RPM on a Corning® glass substrate has an average optical transmittance of 80.3% from 400 to 800 nm (this is the transmittance of the glass plus the poly(EDOT-block-EG 1098) thin film). This film has a surface resistance of $1.4 \times 10^7$ Ohms/square. A thicker film that was obtained by spin casting two coatings of the dispersion at 500 RPM has an average optical transmittance of 70.9% over the entire visible spectrum (400 to 800 nm) and a surface resistance of $4 \times 10^5$ Ohms/square.

The surface roughness of these thin films was measured by contact mode atomic force microscopy. The average surface roughness was measured to be 30-40 nm.

Example 10

Processing of a poly(EDOT-block-EG 1098) Purified Gel into a Nitromethane Dispersion Nitromethane (230 mL) was mixed with 25 g of poly (EDOT-block-EG 1098) gel (11 wt. % solids, prepared according to the procedure given in Example 1) to form a dispersion with 1 wt. % solids concentration. This mixture was ultrasonically processed using a Cole Parmer 500 Watt sonic piezo horn immersed into the dispersion 1 cm below the surface. The amplitude was set to 75% and the sample was processed for 30 seconds. This sonication was repeated 2 more times with recapping and shaking the sample between each sonication step. The sample was filtered by gravity through a 70-micron pore Spectra/Mesh Fluorocarbon filter (Cole Parmer) to remove any remaining large particles.

We claim:

1. A method of producing a stable colloidal dispersion of a poly(heteroaromatic) block copolymer in one or more polar solvents comprising the following steps:
   a. synthesizing a doped poly(heteroaromatic) block copolymer by oxidative copolymerization in water, an organic solvent or a mixture thereof of one or more heteroaromatic monomers and one or more linear non-conjugated polymeric blocks that are terminated at one end or at both ends with an end group that can undergo oxidative polymerization;
   b. separating the block copolymer formed in step "a" from the oxidative polymerization reaction mixture of step "a", wherein the block copolymer forms a gel during the separation process, which gel remains in a wet state;
   c. purifying the wet block copolymer gel of step "b" from byproducts, unreacted reagents, and spent reactants of step "a" by a wet processing technique employing a solvent such that the wet block copolymer gel is kept in a wet state, and
   d. diluting the purified wet block copolymer gel of step "c" with an organic solvent, water or a miscible mixture thereof to form a stable colloidal dispersion,
wherein the concentration of the poly(heteroaromatic) block copolymer in the wet block copolymer gel is between 3-13 weight % and the viscosity of the wet block copolymer gel is such that free flowing does not occur at room temperature in the absence of shear.

2. The method of claim 1 wherein the number average particle size of the stable colloidal dispersion of step "d" is less than or equal to 1 micron as measured in the wet swollen state by laser scattering, and the surface roughness of a dry film spin coated on float glass is less then 40 nanometers as determined by atomic force microscopy.

3. The method of claim 1 wherein the one or more heteroaromatic monomers are selected from the group consisting of pyrrole, N-alkylpyrrole, 3-alkylpyrrole, thiophene, 3-alkylthiophene, 3-alkoxythiophene, 3,4-alkenylthiophene, 3,4-alkylenedioxythiophene, thieno[3,4-b]thiophene and their substituted derivatives and the one or more linear non-conjugated polymeric blocks are selected from the group consisting of di-thiophene terminated polymer, di-(3,4-ethylenedioxythiophene)-terminated polymer, di-(thieno[3,4-b] thiophene)-terminated polymer, di-pyrrole terminated polymer, mono-thiophene terminated polymer, mono-(thieno[3,4-b]thiophene)-terminated polymer, mono-pyrrole terminated polymer, and mono-(3,4-ethylenedioxythiophene)-terminated polymer.

4. The method of claim 1 wherein the solvents of steps "a," "c" and "d" may be the same or different and are selected from the group consisting of acetonitrile, propionitrile, benzonitrile, nitromethane, nitroethane, acetone, methylethylketone, chloroform, dimethylsulfoxide, N,N-dimethylformamide, N-methylpyrrolidone, propylene carbonate, or mixtures thereof.

5. The method of claim 1 wherein the process steps employ organic solvents and the organic solvent of "step a" is acetonitrile, the organic solvent of "step c" is either acetonitrile or ethanol, and the organic solvent of step "d" is either nitromethane or propylene carbonate.

6. The method of claim 1 further comprising the step of processing diluted purified wet block copolymer gel of step "d" ultrasonically or using high-shear mixing methods.

7. The method of claim 1 further comprising the step of adding a rheology modifier to the diluted purified wet block copolymer gel of step "d".

8. The method of claim 1 wherein the wet processing technique used in purification step "c" comprises repeating in sequence the steps of centrifugation of the suspension; separation of the wet cake from the supernatant; and re-suspension of the wet cake in a clean solvent until the desired level of purification is achieved.

9. The method of claim 1 wherein the linear non-conjugated polymeric block is a polyether, polyglycol or poly(ethyleneglycol).

10. The method of claim 9 wherein the terminating end group is a thiophene or pyrrole.

11. The method of claim 10 wherein the terminating end group is a 3,4-ethylenedioxythiophene.

12. The method of claim 1 wherein the ratio between the heteroaromatic monomer and the linear non-conjugated polymeric block ranges from about 20:1 to about 1:5 by weight.

13. The method of claim 12 wherein the linear non-conjugated polymeric block is selected from the group consisting of polyethers, poly(fluoroethers), polyglycols, polyacetals, polyolefins, polystyrene, polyfluoroolefins, polyoxides, polychloroolefins, polychlorofluoroolefins, polysiloxanes, polyesters, polybromoesters, natural and synthetic rubbers, polyacids, polycarbonates, polyanhydrides, polysulfides, polyamides, polyamines, polyimides, vinyl polymers polyacrylates, polymethacrylates, polyacrylonitriles, polybutadiene, alkyds, polyalcohols, polyurethanes, epoxies, cellulose, starch, polypeptides, and copolymers thereof.

14. The method of claim 13 wherein the heteroaromatic monomer is selected from the group consisting of pyrrole, N-alkylpyrrole, 3-alkylpyrrole, thiophene, 3-alkylthiophene, 3-alkoxythiophene, 3,4-alkenylthiophene, 3,4-alkylenedioxythiophene, thieno[3,4-b]thiophene and their substituted derivatives and the linear non-conjugated polymeric block is selected from the group consisting of di-thiophene terminated polymer, di-(3,4-ethylenedioxythiophene)-terminated polymer, di-(thieno[3,4-b]thiophene)-terminated polymer, di-pyrrole terminated polymer, mono-thiophene terminated polymer, mono-(thieno[3,4-b]thiophene)-terminated polymer, mono-pyrrole terminated polymer, and mono-(3,4-ethylenedioxythiophene)-terminated polymer.

15. The method of claim 1 wherein the gel separation and wet processing technique is collection of the wet block copolymer gel from the reaction mixture by centrifugation, followed by steps of decanting and rinsing with non-aqueous solvents, aqueous solvents, water or a mixture thereof, each followed by centrifugation, wherein the centrifugation, decanting and rinsing is continued until a desired level of purification is achieved.

16. The method of claim 1 wherein the heteroaromatic monomers are 3,4-alkylenedioxythiophenes.

17. The method of claim 1 wherein the number average particle size of the colloidal dispersion is less than 2 microns as measured in the wet swollen state by laser scattering, and the surface roughness of a dry film spin coated on float glass is less then 50 nanometers as determined by atomic force microscopy.

18. The method of claim 1 wherein the concentration of the block copolymer in the stable colloid dispersion of step "d" ranges from 0.2-1.5% by weight.

19. The method of claim 1 wherein the concentration of the block copolymer in the wet block copolymer gel ranges from 3-8% by weight.

20. The method of claim 1 wherein purification of step "c" comprises one or more steps of washing with solvent.

21. The method of claim 1 wherein each of the synthesis, purification and diluting steps is carried out employing different solvents.

22. The method of claim 1 wherein synthesis is carried out in acetonitrile, purification is carried out in ethanol or acetonitrile and diluting is carried out with nitromethane or propylene carbonate.

23. The method of claim 1 wherein the oxidative polymerization reaction employs an iron (III) salt as the oxidant and the purified wet block copolymer gel comprises less than 100 ppm of iron.

24. The method of claim 1 wherein the poly(heteroaromatic) block copolymer is a triblock or multiblock copolymer containing at least one block of a poly(heteroaromatic) polymer and at least two blocks of a linear non-conjugated polymer.

* * * * *